(12) United States Patent
Nystad

(10) Patent No.: US 8,891,886 B2
(45) Date of Patent: Nov. 18, 2014

(54) METHOD OF AND APPARATUS FOR ENCODING DATA

(71) Applicant: ARM Limited, Cambridge (GB)

(72) Inventor: Jorn Nystad, Trondheim (NO)

(73) Assignee: ARM Limited, Cambridge (GB)

( * ) Notice: Subject to any disclaimer, the term of this patent is extended or adjusted under 35 U.S.C. 154(b) by 18 days.

(21) Appl. No.: 13/630,040

(22) Filed: Sep. 28, 2012

(65) Prior Publication Data

US 2013/0084018 A1    Apr. 4, 2013

(30) Foreign Application Priority Data

Sep. 30, 2011    (GB) .................................... 1117110.5

(51) Int. Cl.
*G06K 9/36*    (2006.01)
*G06T 9/00*    (2006.01)

(52) U.S. Cl.
CPC .... *G06K 9/36* (2013.01); *G06T 9/00* (2013.01)
USPC ........... 382/232; 382/165; 382/181; 382/274; 382/190; 382/170

(58) Field of Classification Search
CPC ........... G06T 9/00; G06T 9/005; G06T 9/008; G06T 11/001; H04N 19/00278; H04N 19/00963; H04N 7/28; G06K 9/32; G06K 9/36; G06K 9/00624
USPC ......... 382/165, 170, 181, 173, 190, 232, 274; 375/240.16
See application file for complete search history.

(56) References Cited

U.S. PATENT DOCUMENTS

| | | | |
|---|---|---|---|
| 5,046,119 | A | 9/1991 | Hoffert |
| 5,047,853 | A | 9/1991 | Hoffert |
| 5,956,431 | A | 9/1999 | Iourcha |
| 6,775,417 | B2 | 8/2004 | Hong |
| 6,937,250 | B1 | 8/2005 | Schilling |
| 6,940,511 | B2 | 9/2005 | Akenine-Moller |

(Continued)

FOREIGN PATENT DOCUMENTS

| | | |
|---|---|---|
| EP | 0775981 | 3/1997 |
| GB | 1517383 | 8/1975 |

(Continued)

OTHER PUBLICATIONS

Combined Search and Examination Report, dated Sep. 27, 2012, GB Patent Application No. GB1208056.0.

(Continued)

*Primary Examiner* — Ali Bayat
(74) *Attorney, Agent, or Firm* — Vierra Magen Marcus LLP

(57) ABSTRACT

A graphics texture data encoding arrangement in which the texels in a texel block 30 to be encoded are divided into different partitions within the block. A reference partitioning pattern for a texel block to be encoded is generated by using a partitioning function 32 to partition the data values for the texels into a number of data value partitions, and then sorting the individual texels in the texel block into respective partitions 33 based on their values. A set of predefined partitioning patterns 35 that the encoding scheme supports is then compared 36 to the generated reference partitioning pattern. The predefined partitioning pattern that best matches 39 the generated reference partitioning pattern is then used 42 to encode the block of texels.

21 Claims, 16 Drawing Sheets

(56) References Cited

U.S. PATENT DOCUMENTS

| | | | |
|---|---|---|---|
| 7,242,811 | B2 | 7/2007 | Fenney |
| 8,102,402 | B2 | 1/2012 | Sorgard |
| 8,289,343 | B2 | 10/2012 | Sorgard |
| 8,666,177 | B2 * | 3/2014 | Chen et al. .................. 382/232 |
| 2003/0227462 | A1 | 12/2003 | Akenine-Moller |
| 2008/0050047 | A1 * | 2/2008 | Bashyam et al. ............. 382/305 |
| 2008/0055331 | A1 * | 3/2008 | Iourcha et al. ................ 345/582 |
| 2011/0148896 | A1 | 6/2011 | Lee |
| 2011/0148897 | A1 * | 6/2011 | Wong et al. .................. 345/582 |
| 2012/0281005 | A1 | 11/2012 | Nystad |
| 2012/0281006 | A1 | 11/2012 | Nystad |
| 2012/0281007 | A1 | 11/2012 | Nystad |
| 2012/0281925 | A1 | 11/2012 | Nystad |

FOREIGN PATENT DOCUMENTS

| | | |
|---|---|---|
| GB | 2423906 | 9/2006 |
| GB | 2439481 | 12/2007 |
| WO | WO9922519 | 5/1999 |
| WO | WO 2008027413 | 3/2008 |
| WO | WO2009/133860 | 4/2009 |

OTHER PUBLICATIONS

Combined Search and Examination Report, dated Oct. 9, 2012, GB Patent Application No. GB1208058.6.

Combined Search and Examination Report, dated Oct. 9, 2012, GB Patent Application No. GB1208059.4.

Combined Search and Examination Report, dated Oct. 8, 2012, GB Patent Application No. GB1208060.2.

Block Truncation Coding, Wikipedia, Aug. 2013, http://en.wikipedia.org/wiki/Block_Truncation_Coding.

Fenney, "Texture Compression using Low-Frequency Signal Modulation," Graphics Hardware 2003, Imagination Technologies Ltc., UK, The Eurographics Association 2003.

PVRTC, Wikipedia, Mar. 2012, http://en.wikipedia.org/wiki/PVRTC.

S3 Texture Compression, Wikipedia, Nov. 2013, http://en.wikipedia.org/wiki/S3_Texture_Compression.

Strom, "iPackman: High-Quality, Low-Complexity Texture Compression for Mobile Phones," Lund University, Graphics Hardware 2005, The Eurographics Association.

UK Search Report dated Mar. 27, 2012, UK Patent Application No. GB 1117110.5.

BC6H Format, 2011 Microsoft, http://msdn.microsoft.com/en-us/library/hh308952(d=printer).aspx.

BC7H Format, 2011 Microsoft, http://msdn.microsoft.com/en-us/library/hh308953(d=printer).aspx.

Levkovich-Maslyuk, "Texture Compression with Adaptive Block Partitions," ACM Multimedia, 2000, pp. 401-403.

Ivanov, "Image Compression with Vector Quantization," Apr. 16, 2001, http://www.gamasutra.com/view/feature/131499/image_compression_with_vector_.php.

Office Action dated Apr. 30, 2014 in U.S. Appl. No. 13/464,663, 6 pages.

Office Action (Restriction) dated May 13, 2014 in U.S. Appl. No. 13/464,686, 6 pages.

Office Action (Restriction) dated May 13, 2014 in U.S. Appl. No. 13/464,696, 6 pages.

Response to Office Action (Restriction) filed Jun. 30, 2014 in U.S. Appl. No. 13/464,663, 13 pages.

Office Action dated Aug. 20, 2014 in U.S. Appl. No. 13/464,663, 24 pages.

Office Action dated Sep. 18, 2014 in U.S. Appl. No. 13/464,686, 29 pages.

Office Action dated Sep. 18, 2014 in U.S. Appl. No. 13/464,696, 24 pages.

* cited by examiner

Block Layout Overview

FIG. 5

*Non-Partitioned Block Layout with Dual Planes*

FIG. 6

*2-Partition Block Layout*

| 127 | 126 | 125 | 124 | 123 | 122 | 121 | 120 | 119 | 118 | 117 | 116 | 115 | 114 | 113 | 112 | 111 | 110 | 109 | 108 | 107 | 106 | 105 | 104 | 103 | 102 | 101 | 100 | 99 | 98 | 97 | 96 |
|---|---|---|---|---|---|---|---|---|---|---|---|---|---|---|---|---|---|---|---|---|---|---|---|---|---|---|---|---|---|---|---|
| Texel Index Data (Variable Width) ||||||||||||||||||||||||||||||||

| 95 | 94 | 93 | 92 | 91 | 90 | 89 | 88 | 87 | 86 | 85 | 84 | 83 | 82 | 81 | 80 | 79 | 78 | 77 | 76 | 75 | 74 | 73 | 72 | 71 | 70 | 69 | 68 | 67 | 66 | 65 | 64 |
|---|---|---|---|---|---|---|---|---|---|---|---|---|---|---|---|---|---|---|---|---|---|---|---|---|---|---|---|---|---|---|---|
| ||||||||||||||||||||||||||||||||

| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
|---|---|---|---|---|---|---|---|---|---|---|---|---|---|---|---|---|---|---|---|---|---|---|---|---|---|---|---|---|---|---|---|
| CM2 ||||| M | CM1 ||||| Endpoint Color Data 2 ||||||||||| Endpoint Color Data 1 |||||||||||

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Data 0 | M | C2 | C1 | C0 | CPS |||| Partition Index ||||||||| 1 | 0 | Endpoint Color |||||| Index Mode |||

3-Partition Block Layout

4-Partition Block Layout

FIG. 9

*2-Partition Block Layout with Dual Planes*

| 127 | 126 | 125 | 124 | 123 | 122 | 121 | 120 | 119 | 118 | 117 | 116 | 115 | 114 | 113 | 112 | 111 | 110 | 109 | 108 | 107 | 106 | 105 | 104 | 103 | 102 | 101 | 100 | 99 | 98 | 97 | 96 |
|---|---|---|---|---|---|---|---|---|---|---|---|---|---|---|---|---|---|---|---|---|---|---|---|---|---|---|---|---|---|---|---|
| | | | | | | Color A | | | | | | | | | | | | | | | | Color B | | | | | | | | | |

| 95 | 94 | 93 | 92 | 91 | 90 | 89 | 88 | 87 | 86 | 85 | 84 | 83 | 82 | 81 | 80 | 79 | 78 | 77 | 76 | 75 | 74 | 73 | 72 | 71 | 70 | 69 | 68 | 67 | 66 | 65 | 64 |
|---|---|---|---|---|---|---|---|---|---|---|---|---|---|---|---|---|---|---|---|---|---|---|---|---|---|---|---|---|---|---|---|
| | | | | | | Color G | | | | | | | | | | | | | | | | Color R | | | | | | | | | |

| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
|---|---|---|---|---|---|---|---|---|---|---|---|---|---|---|---|---|---|---|---|---|---|---|---|---|---|---|---|---|---|---|---|
| | | | | | | High T | | | | | | | | | Low T | | | | | | | | | | | | | High S | | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | | | | | | | Low S | | | | | | | | | | | 1 | 1 | 1 | D | 1 | 1 | 1 | 1 | 1 | 1 | 1 | 1 | 0 | 0 |

2D Void-Extent Block Layout

FIG. 10

| 127 | 126 | 125 | 124 | 123 | 122 | 121 | 120 | 119 | 118 | 117 | 116 | 115 | 114 | 113 | 112 | 111 | 110 | 109 | 108 | 107 | 106 | 105 | 104 | 103 | 102 | 101 | 100 | 99 | 98 | 97 | 96 |
|---|---|---|---|---|---|---|---|---|---|---|---|---|---|---|---|---|---|---|---|---|---|---|---|---|---|---|---|---|---|---|---|
| | | | | Color A | | | | | | | | | | | | | | | | | Color B | | | | | | | | | | |

| 95 | 94 | 93 | 92 | 91 | 90 | 89 | 88 | 87 | 86 | 85 | 84 | 83 | 82 | 81 | 80 | 79 | 78 | 77 | 76 | 75 | 74 | 73 | 72 | 71 | 70 | 69 | 68 | 67 | 66 | 65 | 64 |
|---|---|---|---|---|---|---|---|---|---|---|---|---|---|---|---|---|---|---|---|---|---|---|---|---|---|---|---|---|---|---|---|
| | | | | Color G | | | | | | | | | | | | | | | | | Color R | | | | | | | | | | |

| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |
|---|---|---|---|---|---|---|---|---|---|---|---|---|---|---|---|---|---|---|---|---|---|---|---|---|---|---|---|---|---|---|---|
| | | | High P | | | | | | | Low P | | | | | | | | | | High T | | | | | | | | Low T | | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| | High S | | | | | | | | | Low S | | | | | | | | | | | | D | 1 | 1 | 1 | 1 | 1 | 1 | 1 | 0 | 0 |

3D Void-Extent Block Layout

METHOD OF AND APPARATUS FOR ENCODING DATA

This application claims priority to UK Patent Application No. 1117110.5 filed Sep. 30, 2011.

BACKGROUND

The technology described herein relates to a method of and apparatus for encoding data, and in particular to such a method and apparatus for use to compress texture data for use in computer graphics systems.

It is common in computer graphics systems to generate colours for sampling positions in the image to be displayed by applying so-called textures or texture data to the surfaces to be drawn. For example, surface detail on objects may be generated by applying a predefined "texture" to a set of polygons representing the object, to give the rendered image of the object the appearance of the "texture". Such textures are typically applied by storing an array of texture elements or "texels", each representing given texture data (such as colour, luminance, and/or light/shadow, etc. values), and then mapping the texels onto the corresponding elements, such as (and, indeed, typically) a set of sampling positions, for the image to be displayed. The stored arrays of texture elements (data) are typically referred to as "texture maps".

Such arrangements can provide high image quality, but have a number of drawbacks. In particular, the storage of the texture data and accessing it in use can place, e.g., high storage and bandwidth requirements on a graphics processing device (or conversely lead to a loss in performance where such requirements are not met). This is particularly significant for mobile and handheld devices that perform graphics processing, as such devices are inherently limited in their, e.g., storage, bandwidth and power resources and capabilities.

It is known therefore to try to encode such texture data in a "compressed" form so as to try to reduce, e.g., the storage and bandwidth burden that may be imposed on a device.

One known such texture data compression technique determines a set or palette of colours to be used for, e.g., a given texture map, and then stores for each texture element (texel) in the texture map an index into the set or palette of colours, indicating the colour to be used for that texel. This has the advantage that only an index, rather than a full (e.g.) colour value needs to be stored for each texel. This helps to reduce, e.g., the texture data storage requirements, but still has some drawbacks, such as in terms of reduced image quality and the necessary data processing.

Another known texture compression technique is to use so-called block truncation coding (BTC). In this technique the overall texture array (texture map) is subdivided into smaller blocks, e.g. of 4×4 texels, and a number (typically two) of base or primary colour values are determined for each such block, with each texel in the block being set to one of the base colour values. This again saves on the data that has to be stored and accessed, but at a cost of lower image quality.

S3 Incorporated of California, USA, have proposed in their U.S. Pat. No. 5,956,431 an improved block truncation coding technique. In this technique, two base colours are again stored for each texel block, but two additional colours to be used for the block are also derived from those two base colours (e.g. by linearly blending those colours). In this way, four colours are provided as a "palette" for the texel block, but only two colour values need to be stored for the block. Each texel in the block is then encoded using two bits, to indicate which of the four block "colours" should be used for the texel. This system provides improved image quality over basic block truncation coding, but requires more data per block.

It is also known in some texture compression schemes, such as BC6 and BC7, to divide the set of texture data elements that is encoded in a given texture data block into plural "sub-sets" or "partitions" of texture data elements.

In these arrangements, each texture data element partition for the texture data block (i.e. sub-set of the texture data elements that the texture data block encodes) then has its own set of base (e.g. endpoint) colour values and so can, effectively, be reproduced independently of the other partitions of the block. This can help to enhance the reproduced image quality, e.g. where the block to be encoded includes distinct colour partitions.

In these arrangements, the encoding scheme typically supports a finite set of allowed partitioning patterns, because of the need to be able to indicate (efficiently) to the decoder which partitioning pattern has been used for a given encoded texture data block. (This is typically done by including a partitioning pattern index in the encoded texture data block that the decoder can then use to identify the partitioning pattern that has been used).

When encoding a given texture data block, it is accordingly necessary to determine which one of the supported set of partitioning patterns to use for the block. This is typically done by test encoding the block using each possible partitioning pattern, determining which of the patterns gives the best result, and then using that pattern as the pattern to use to encode the block.

While such "brute force" partitioning pattern testing may work satisfactorily where there is only a limited number of possible partitioning patterns in the supported set of partitioning patterns, the Applicants have recognised that such techniques may not be so suitable as the number of possible partitioning patterns in the supported set of partitioning patterns increases (as the time needed to test a large number of partitioning patterns in this way may become too large).

The Applicants believe therefore that there remains scope for improved techniques for determining the partitioning pattern to use when, e.g., encoding texture data for graphics processing.

BRIEF DESCRIPTION OF THE DRAWINGS

A number of embodiments of the technology described herein will now be described by way of example only and with reference to the accompanying drawings, in which:

FIGS. 3 to 11 show encoded block layouts of the described embodiment of the technology described herein;

FIGS. 12 to 15 illustrate the partitioning pattern selection process of the described embodiment of the technology described herein.

Like numerals are used for like features in the drawings (where appropriate).

DETAILED DESCRIPTION

Figure 1:
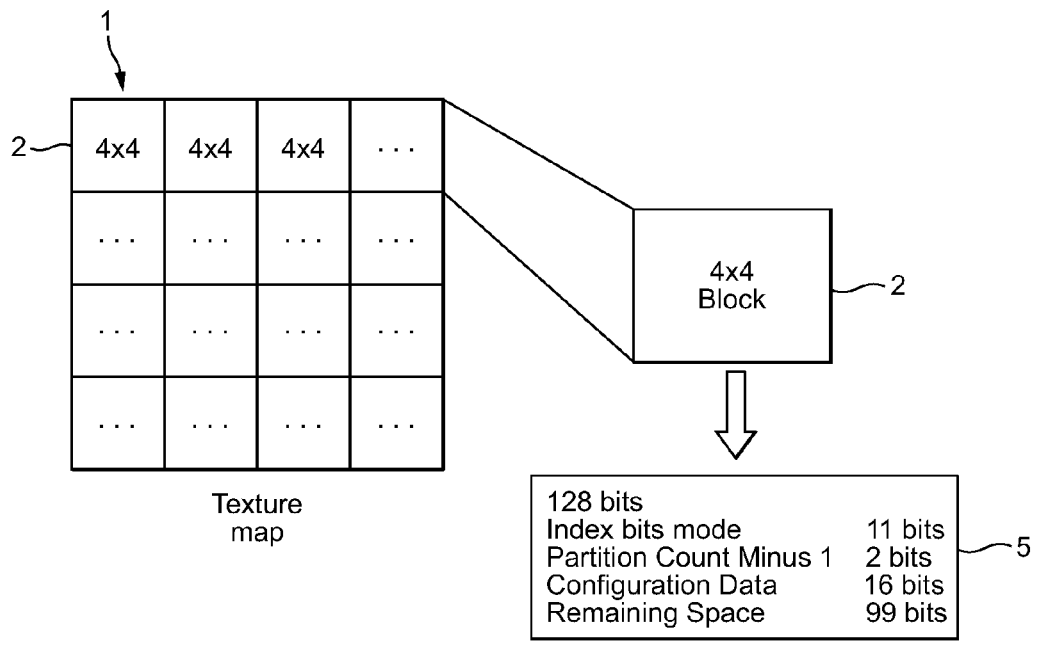
FIG. 1 shows schematically the encoding of an array of image data as a plurality of encoded data blocks.

A first embodiment of the technology described herein comprises a method of determining which one of a set of plural predefined partitioning patterns to use to divide texture data elements of a block of texture data elements to be encoded into separate partitions within the block for encoding purposes, the method comprising:
  generating a reference partitioning pattern for the block of texture data elements using a partitioning function;
  comparing some or all of the predefined partitioning patterns in the set of plural predefined partitioning patterns to the generated reference partitioning pattern; and
  selecting one of the predefined partitioning patterns in the set of plural predefined partitioning patterns as the partitioning pattern to use when encoding the block of texture data elements on the basis of the comparison.

A second embodiment of the technology described herein comprises an apparatus for determining which one of a set of plural predefined partitioning patterns to use to divide texture data elements of a block of texture data elements to be encoded into separate partitions within the block for encoding purposes, the apparatus comprising:
  processing circuitry configured to generate a reference partitioning pattern for the block of texture data elements using a partitioning function;
  processing circuitry configured to compare some or all of the predefined partitioning patterns in the set of plural predefined partitioning patterns to the generated reference partitioning pattern; and
  processing circuitry configured to select one of the predefined partitioning patterns in the set of plural predefined partitioning patterns as the partitioning pattern to use when encoding the block of texture data elements on the basis of the comparison.

The technology described herein relates to a texture data encoding (compression) scheme that uses predefined partitioning patterns to divide blocks of texture data elements to be encoded into partitions for encoding purposes. However, in the technology described herein, the partitioning pattern to use for a texture data block is not simply determined by a "brute force" test of the predefined partitioning patterns. Instead, the technology described herein uses a partitioning function to generate a reference partitioning pattern, and then selects which of the predefined partitioning partitions to use for the block based on a comparison of the generated reference partitioning pattern with some or all of the predefined partitioning patterns.

As will be discussed further below, the Applicants have found that this approach can identify a suitable partitioning pattern to use more quickly and more efficiently than existing techniques, and even in the case where there is a relatively large number of predefined partitioning patterns to choose from. For example, it can greatly reduce the time and computational load needed to select a suitable partitioning pattern as compared to, for example, a "brute-force" approach.

The partitioning function that is used when generating the reference partitioning pattern can be any suitable such function. The intention is to try to generate an "ideal" (or at least an approximately "ideal") reference partitioning pattern for the block without reference to the set of predefined partitioning patterns, i.e. to try to determine, in effect, a partitioning pattern that should be used for the block if there was, in effect, a free choice of partitioning pattern to use (in contrast to being constrained to use one of a set of predefined partitioning patterns). Any partitioning function that can do this can be used.

The partitioning function in an embodiment determines data (e.g. colour) value partitions to be used for the block, based on the data (e.g. colour) values of the texture data elements of the block (i.e. determines its partitions based on the distribution of the data values (e.g. colour values) of the texture data elements of the block in the "data value" space (in the "colour space"). The partitioning function in an embodiment operates on the texture data values directly.

In an embodiment, once the data (e.g. colour) value partitions have been determined in this way, each texture data element in the block is then allocated to a respective data value (e.g. colour value) partition based on its value, to then give the reference partitioning pattern for the block.

In an embodiment, the partitioning function comprises a clustering function that partitions the texture data element values into a given number of clusters (i.e. partitions) of data values, e.g., and in an embodiment, such that when each data value is assigned to the cluster whose mean value it is nearest to, a given "error" metric is minimised.

Any suitable and desired data value "clustering" function can be used for this purpose. In an embodiment, a k-means clustering-type function (which can also be referred to as Lloyd's Algorithm), i.e. the k-means clustering function or a clustering function that is related to or derived from the k-means clustering function (such as k-means clustering modified to cluster around lines rather than cluster centres, the k-medioid method, or other variations of the k-means clustering function) is used as the partitioning function used when generating the reference partitioning pattern. (As is known in the art k-means clustering attempts to find a set of a given (and specified) number of cluster centre values that minimise the sum of squared distances from each data value being clustered to its cluster centre value (to the value of the centre that is closest to it).) In an embodiment, the partitioning function used when generating the reference partitioning pattern comprises using the k++-means method to initialise a k-means clustering process.

The Applicants have found that using such clustering functions can quickly and accurately identify suitable reference partitioning patterns.

Where the partitioning function is an iterative process, such as would be the case when using k-means-type clustering, then while the process could be run to its "finish" (i.e. until it has found the "best" partitioning it can), it would also be possible to, e.g., configure the partitioning function to stop after a given time and/or number of iterations, even if it has not yet "finished", and to take the partitioning at the "stop" point as the partitioning to use for the reference partitioning pattern. The Applicants have found that the technology described herein can still provide good results, even where the "ideal" partitioning is not reached by the partitioning function.

At least one reference partitioning pattern should be generated. However, in one embodiment a plurality of reference partitioning patterns are generated. In this case, each reference partitioning pattern in an embodiment divides the block into a different number of partitions. Any desired numbers of partitions can be considered, such as, and in an embodiment, 2, 3 or 4 partitions. Thus, in one embodiment, one reference partitioning pattern is generated (e.g. having 2 partitions), and in another embodiment, plural reference partitioning patterns, each containing a different number of partitions, are generated (such as one reference partitioning pattern having 2 partitions, another having 3 partitions, and so on (if desired)).

The set of predefined partitioning patterns that the reference partitioning pattern is compared with can comprise any desired and suitable set of predefined partitioning patterns. It in an embodiment comprises some or all, and in an embodiment all, of the predefined partitioning patterns that the texture data encoding (compression) scheme in question supports (i.e. that, in effect, can be indicated to, and identified by, a decoder for the texture encoding scheme in question). The texture encoding scheme could, e.g., have a set of specified predefined partitioning patterns that each have their own index (such as is the case for BC6 and BC7 encoding, for example). Alternatively, the texture encoding scheme could, for example, use a partitioning pattern generation function to generate the partitioning patterns that it uses (but in this case, there will still be a (finite) set of predefined partitioning patterns, namely those patterns that the partitioning pattern generation function can generate). The set of predefined partitioning patterns in an embodiment includes patterns that have different numbers of partitions.

The generated reference partitioning pattern or patterns can be compared with some or all of the patterns in the set of predefined partitioning patterns. In an embodiment, each reference pattern is compared with (and in an embodiment only compared with) patterns in the set of predefined partitioning patterns that contain the same number of partitions as the reference partitioning pattern. In an embodiment each reference pattern is compared with (and only with) all of the patterns in the set of predefined partitioning patterns that contain the same number of partitions as the reference partitioning pattern in question.

The generated reference partitioning pattern(s) can be compared with the predefined partitioning patterns in any desired and suitable manner. In an embodiment the comparison is so as to assess the similarity (or not) between the reference partitioning pattern and a predefined partitioning pattern (and each predefined partitioning pattern) that it is being compared with. In an embodiment it is determined how closely each predefined partitioning pattern that is being considered matches the (or the respective) generated reference partitioning pattern.

Any suitable comparison or similarity measure and metric can be used for this purpose. In an embodiment a relatively cheap metric that gives an indication of how close one pattern is to the other is used.

In an embodiment, each partitioning pattern (both the reference and predefined patterns) is represented as an array of partition indices, one for each texture data element in the block. (Thus, in the case of a two-partition pattern, each texture data element will be assigned the value 0 or 1, depending upon which partition its data value falls in.) The comparison process in an embodiment then comprises comparing the two arrays, in an embodiment to assess how closely they match (or not). The appropriate arrays can be predetermined and stored for the set of predefined partitioning patterns to facilitate this, if desired.

In an embodiment, the Hamming distance or an approximation of the Hamming distance between the patterns being compared is determined (and then used as a "similarity" measure for the patterns in question). The Applicants have found that determining the Hamming distance provides a particularly quick and convenient mechanism for comparing (and assessing the similarity between) respective pairs of partitioning patterns.

(The Hamming distance between two arrays of equal length is the number of positions at which the corresponding elements of each array are different (and thus provides a measure of how similar (or not) the two arrays are). Thus, the Hamming distance is a particularly convenient measure for assessing the similarity between a generated reference partitioning pattern and a given predefined partitioning pattern.)

Thus, the comparison process in an embodiment comprises representing each partitioning pattern being compared using a binary code, and determining the similarity (or not) of the patterns being compared by determining the Hamming distance for each respective pair of patterns being compared.

The Hamming distance is in an embodiment calculated by iterating across all the elements of one pattern, comparing each element with the corresponding element in the other pattern, and counting the number of elements that are not equal.

In an embodiment, the Hamming distance is calculated using an XOR function. This is a particularly convenient mechanism for determining the Hamming distance, and that can be used for comparing patterns having any number of partitions.

For example, in the case of 2-partition patterns, each pattern can be, and is in an embodiment, represented as bit-vectors (with one bit set to 0 or 1 for each texture data element in the pattern depending upon which partition it is in), and the difference between the patterns determined by a bitwise XOR between the two bit-vectors (thereby giving a result bit-vector in which a bit is set if the corresponding bits in the bit-vectors representing the patterns are different). The Hamming distance is then the number of bits that are set in the result bit vector (in the XOR-result), which can be straightforwardly counted.

A similar process can be used for higher numbers of partitions. For example, in the 3- and 4-partition case, the patterns being compared can be, and in an embodiment are, represented as bit-vectors in which the partition indices for the texture data elements are packed into pairs of adjacent bits, and the bit vectors XORed, but with the additional step of combining the pairs of bits in the XOR result using an OR operation before counting the set bits to determine the Hamming distance.

In these arrangements, the bit-vectors for the predefined partitioning patterns can be predetermined and stored for use in the comparison process to facilitate the comparison process, if desired.

In an embodiment, the comparison is carried out for each possible permutation of the partition allocations in the reference partitioning pattern or patterns. Thus, for example, where the reference partitioning pattern contains two partitions, both partitioning permutations are in an embodiment compared to the predefined partitioning patterns. This allows for the fact that the labelling of the partitions is arbitrary. Where this is done, the closest match to any permutation of the reference partitioning pattern is in an embodiment taken as the similarity measure for the predefined partitioning pattern in question (i.e., where the Hamming distance is being considered, the minimum Hamming distance to any permutation of the reference partitioning pattern is taken as the Hamming distance for the predefined partitioning pattern in question).

Instead of testing each possible permutation of the partition allocations in the reference partitioning pattern(s), it would be possible to compare a single permutation of the reference pattern with each possible permutation of each predefined partitioning pattern. However, as to do this would require the generation and/or storage of every permutation of every one of the predefined partitioning patterns, in an embodiment the permutations of the reference pattern(s) are generated and tested.

The comparison between the reference partitioning pattern and the predefined, partitioning patterns could be based on a comparison of the patterns in their entirety (e.g. a Hamming distance calculation that uses all the texture data element positions in the patterns), and in one embodiment, this is what is done.

However, it would also be possible for the comparison between the reference partitioning pattern and the predefined partitioning patterns to be based on (and to consider) only part, but not all, of each pattern, for example to compare only a sub-set of the texture data elements for each pattern. For example, the Hamming distance could be calculated for a subset of (such as half of) the texture data elements in each pattern (such that an estimate of the Hamming distance, rather than the exact Hamming distance would be determined). This may help to make the comparison process faster. In another embodiment, this is done.

The predefined partitioning pattern to use when encoding the texture data block can be selected in any desired and suitable manner on the basis of the comparison between the reference partitioning pattern and the predefined partitioning patterns. For example, the predefined partitioning pattern found to be closest to (most similar to), e.g. having the minimum Hamming distance from, the reference partitioning pattern could be, and in one embodiment is, selected as the predefined partitioning pattern to use when encoding the texture data block.

In an embodiment the predefined partitioning pattern to use is selected as being the predefined partitioning pattern that is closer than a selected threshold similarity measure to the, or one of the, generated reference partitioning patterns (e.g. that has a Hamming distance less than (or less than or equal to) a threshold minimum Hamming distance from the (or one of the) generated reference partitioning pattern). Thus, in an embodiment, the predefined partitioning pattern selection is based on a comparison threshold.

The Applicants have recognised that the partitioning pattern comparison could identify a plurality of predefined partitioning patterns that are apparently equally similar to (e.g. that have the same Hamming distance from) the generated reference partitioning pattern(s). In this case, the first identified one, or a random one, etc., of these apparently equivalent predefined partitioning patterns could be selected as the partitioning pattern to use, if desired.

However, in an embodiment, to account for this possibility (and for other reasons), the pattern comparison is used to identify a set of candidate predefined partitioning patterns from the set of predefined partitioning patterns, and that set of candidate predefined partitioning patterns is then subjected to further testing (analysis) to select the actual predefined partitioning pattern to use. In other words, the comparison with the reference partitioning pattern(s) is in an embodiment used to select a sub-set of the set of predefined partitioning patterns that is then subjected to further testing (assessment).

In these arrangements, the set of candidate predefined partitioning patterns that is tested further can be selected as desired based on the comparison. It could, for example, comprise all the predefined partitioning patterns that are within a selected similarity threshold (e.g. Hamming distance from) a generated reference partitioning pattern.

In an embodiment, the comparison is used to rank the predefined partitioning patterns in order of similarity to the (or one of the) reference partitioning patterns, and the set of candidate predefined partitioning patterns that are tested further is then selected as, e.g., and in an embodiment, a selected number of the patterns from the ranking (e.g. the first 5 most similar patterns), or as being the predefined partitioning patterns in the ranking that can be tested further in a given, e.g., selected, time period. In the latter case, the process accordingly in an embodiment comprises testing the predefined partitioning patterns further in the order of their similarity ranking until a selected time period for that testing has expired (and then selecting the predefined partitioning pattern to use based on, and from those patterns that have been subjected to, the further testing).

In these arrangements where a set of candidate predefined partitioning patterns are subject to further testing, then that further testing can be carried out in any suitable and desired manner (i.e. that can potentially distinguish between the suitability of the different candidate predefined partitioning patterns). In an embodiment the further testing comprises encoding in full or in part the texture data block using each identified candidate predefined partitioning pattern, and then determining how accurately each candidate predefined partitioning pattern represented the texture data block. The most accurate candidate predefined partitioning pattern is in an embodiment then selected as the partitioning pattern to use.

The accuracy of the predefined partitioning patterns can be assessed in these arrangements as desired. In an embodiment an error measure, in an embodiment in the form of a peak signal to noise ratio, in an embodiment in the form of a perceptually weighted noise measure, is determined for the encoded block for each identified candidate predefined partitioning pattern, and the candidate predefined partitioning pattern to use then selected on the basis of the error measures (e.g. by selecting the candidate predefined partitioning pattern having the lowest error measure). Other arrangements would, of course, be possible.

The testing of the partitioning patterns in these arrangements of the technology described herein thus in an embodiment comprises encoding the block using the selected candidate predefined partitioning patterns, and then reproducing the so-encoded blocks, and determining the relative error in comparison to the original texture data (and then, e.g., selecting the predefined partitioning pattern giving the least error as the pattern to use).

Although in these arrangements, the identified candidate predefined partitioning patterns may, in effect, be subjected to a "brute force" test and assessment, the technology described herein is still advantageous, because it only does this testing on a more limited set of identified candidate predefined partitioning patterns. Moreover this further testing can be advantageous in the context of the technology described herein because it can, e.g., distinguish between predefined partitioning patterns that appear identical according to the comparison with generated reference partitioning pattern(s), and it can also, e.g., account for the situation where a predefined partitioning pattern that is apparently worse according to the comparison with a generated reference partitioning pattern (e.g. because it has a greater Hamming distance from that pattern) may in fact still be a better match to the generated reference partitioning pattern (i.e. it can help to account and compensate for any limitations in the, e.g., accuracy of the comparison process).

Thus, in an embodiment, the comparison process is used to identify a set of candidate predefined partitioning patterns, which candidate predefined partitioning patterns are then subjected to further (and in an embodiment more detailed and/or more thorough and/or more accurate) analysis, with the partitioning pattern to use then being selected from the set of identified candidate predefined partitioning patterns on the basis of the further analysis of those identified candidate predefined partitioning patterns.

Although the technology described herein has been described above with particular reference to the process of selecting the predefined partitioning pattern to use when encoding the texture data block, it will be appreciated that the technology described herein also extends to, and in an embodiment does include, encoding the set of texture data elements as a block of texture data representing the texture data elements using the selected predefined partitioning pattern.

Thus, a third embodiment of the technology described herein comprises a method of encoding a set of texture data elements to be used for graphics processing as a block of texture data representing the texture data elements, comprising:

generating a reference partitioning pattern that will divide the texture data elements in the encoded block of texture data elements into separate partitions within the block using a partitioning function;

comparing some or all of the predefined partitioning patterns in a set of plural predefined partitioning patterns to be used to divide texture data elements of a block of texture data elements to be encoded into separate partitions within the block for encoding purposes with the generated reference partitioning pattern;

selecting one of the predefined partitioning patterns in the set of plural predefined partitioning patterns as the partitioning pattern to use when encoding the set of texture data elements on the basis of the comparison; and encoding the set of texture data elements as a block of texture data representing the texture data elements using the selected predefined partitioning pattern.

A fourth embodiment of the technology described herein comprises an apparatus for encoding a set of texture data elements to be used for graphics processing as a block of texture data representing the texture data elements, comprising:

processing circuitry configured to generate a reference partitioning pattern that will divide the texture data elements in the encoded block of texture data elements into separate partitions within the block using a partitioning function;

processing circuitry configured to compare some or all of the predefined partitioning patterns in a set of plural predefined partitioning patterns to be used to divide texture data elements of a block of texture data elements to be encoded into separate partitions within the block for encoding purposes with the generated reference partitioning pattern;

processing circuitry configured to select one of the predefined partitioning patterns in the set of plural predefined partitioning patterns as the partitioning pattern to use when encoding the set of texture data elements on the basis of the comparison; and processing circuitry configured to encode the set of texture data elements as a block of texture data representing the texture data elements using the selected predefined partitioning pattern.

As will be appreciated by those skilled in the art, these embodiments of the technology described herein can and in an embodiment do include any one or more or all of the features of the technology described herein described herein, as appropriate. Thus, for example, the predefined partitioning pattern to use is in an embodiment selected in accordance with the arrangements described above.

The encoded texture data block should include all the information that is necessary for, and/or expected by, a decoder, to allow the decoder to decode the encoded texture data block to reproduce (at least approximately) the original set of texture data elements. The data that should be included in the encoded texture data block to achieve this will depend upon the exact nature of the texture data encoding (compression) scheme in question.

However, in an embodiment the encoded texture data block includes at least some information to allow the decoder to identify which of the predefined partitioning patterns has been used for the encoded texture data block, data indicating or allowing to be derived a base data (colour) value or values (such as colour endpoint values) for each respective partition that the encoded texture data block has been divided into, and information to allow the decoder to determine (at least an approximation to) the value of a given texture data element from the base reference value or values (e.g. endpoint colours) for the partition that the texture data element belongs to. This data can be arranged in any suitable and desired manner in the encoded texture data block (i.e. in practice in the manner that a decoder can recognise and correctly interpret).

In one embodiment, each encoded block of texture data includes, inter alia, data indicating how to generate a set of data values (e.g. colour endpoint values) to be used to generate data values for a set of the texture data elements that the block represents, and data indicating how to use the generated set of data values (e.g. colour endpoint values) to generate data values for texture data elements of the set of texture data elements that the generated set of data values is to be used for.

The information that is included in the encoded texture data block to indicate which predefined partitioning pattern has been used for the blocks can take any suitable and desired form.

For example, where the predefined partitioning patterns are stored, e.g., as a look-up table, for use by the decoder, then the encoded texture data block in an embodiment includes information, such as an index, that indicates to the decoder which of the stored predefined partitioning patterns has been used.

Where the predefined partitioning patterns are generated using a partitioning pattern generation function, then the encoded texture data block in an embodiment includes information to be used by the decoder to configure the partitioning pattern generation function so as to allow the decoder to generate the particular predefined partitioning pattern that has been used. This information in an embodiment comprises a partitioning pattern generation function index or seed, and the number of partitions, that were used as inputs to the partitioning pattern generation function at the encoding stage for generating the predefined partitioning pattern that was used. (The decoder in an embodiment then uses this information, together with the position of the texture data element to be decoded (i.e. whose value is to be determined), as inputs to the partitioning pattern generation function, to determine which partition of the encoded texture data block, the texture data element in question belongs to. Once this has been done, the decoder can then, e.g., and in an embodiment, determine the base data values (e.g. endpoint colours) to be used for the partition that the texture data element has been determined to belong to, and then use those data values to determine the data value (e.g. colour value) to be used for the texture data element itself.)

In an embodiment, each texture data element partition for the texture data block has its own base value(s) (e.g. colour endpoint value(s)) and/or set of data indicating how to generate a set of data values to be used to generate data values for the particular sub-set of the texture data elements that the partition corresponds to (i.e. for the sub-set that the partition corresponds to).

For example, each partition of a texture data block could, and in an embodiment does, have its own colour endpoints or colour endpoints encoding, which can be specified independently of the colour endpoints or colour endpoint encodings for the other texture data element partitions in the encoded block. For example, one partition could have a full RGB colour encoding scheme but another partition could use a grayscale encoding scheme, within the same encoded texture data block.

This then allows each partition of a given texture data block to be reproduced using its own particular data value generation method and/or set of generated data values. This has the advantage that different partitions can use, in effect, different encoding schemes (and in an embodiment, this is done).

This then provides a very flexible system, that allows, for example, multiple different types of content to be encoded in (and mixed within) the same texture and in the same encoded texture data block. This can also help to reduce the number of different separate texture compression (encoding) formats that need to be used.

The base set of data values (e.g. endpoint colours) to be used for a partition can be generated as desired, for example, by, as is known in the art, assessing the data values present in the original texture data (i.e. the data which is to be encoded and compressed) and deriving therefrom a set of data values that are representative of and/or can be used to derive, the original data values. Where a clustering function has been used to select the partitioning pattern to use, the determined cluster centre values could, e.g., be used as and/or to derive the base data values for the block partitions. Any suitable technique can be used for this, such as, for example, using error comparison techniques to determine a reduced set of data values that best matches the original set of data values.

The base set of data values is in an embodiment determined on a block-by-block and/or partition-by-partition basis. For example, in the case of colour data, as in conventional block truncation encoding techniques, one or two (or more) base representative colours could be determined for each different partition of a texture block, which colours would then serve as the base colour palette to be used when generating the set of colours to be used when reproducing the respective partitions of the texture block.

In an embodiment, the set of base data values for a partition comprises a pair of data values. In an embodiment it comprises a pair of endpoint data values, such as a pair of endpoint colour values, from which, e.g., data (e.g. colour) values for texture data elements of the partition in an embodiment can be interpolated (and in an embodiment can be derived by determining a weighted sum of the endpoint values for the partition). The base data values could instead comprise, e.g., a base value and a difference value that can then be combined to give values for the texture data elements, if desired.

Although in these arrangements, separate base data values (e.g. endpoint colours) are specified for each respective texture data element partition, in an embodiment the partitions of the encoded texture data block do share (use in common) some data that is encoded in the block. This has the advantage that the "partitions" within the texture data block can effectively share some of the block information, thereby facilitating higher data compression rates.

The encoded texture data block in an embodiment further includes data indicating how to use the respective sets of base data values (e.g. endpoint colours), or generated sets of base data values, for each partition to generate data values for the texture data elements of the partitions that the block is divided into.

The data that is included in the encoded texture data block for indicating how to use the set of base data values (e.g. colour endpoint values) to generate the data values for the individual texture data elements of the partition can be any suitable such data. In an embodiment, it comprises index data, giving indexes for some or all of the texture data elements in question, and that can be used to derive the data values for the texture data elements from the base data values.

In an embodiment the indexes are used to interpolate the data value for a given texture data element from the base (e.g. endpoint) data values. In an embodiment the index is used as or to derive a weight to compute a weighted sum of the base data values (e.g. endpoint values) (which weighted sum is then used as the data value for the texture data element to which the index relates).

The technology described herein can be used to encode any suitable form of texture data. As discussed above, such data, in its original, raw or unencoded form, is typically arranged in the form of arrays of texture elements or texels, and thus in an embodiment, the technology described herein is used to encode an array of texture data elements (texels). Such arrays are typically, as is known in the art, 2-dimensional, although it is also possible to use the technology described herein to encode a 3-dimensional array (and, indeed, it is an advantage of the technology described herein that it can be used to encode 3-dimensional textures in an efficient manner).

The texture to be encoded and the texture data elements can represent any suitable texture data. In one embodiment the texture is a texture that is to be used for graphics processing, e.g., and in an embodiment, when rendering an image and/or frame for display, such as for example an image to be applied to primitives to be rendered, colours (including grayscale), luminances, bump-maps, shadow-maps (light-maps), etc., as is known in the art.

However, the technology described herein can also be used to process and encode (and decode) textures to be used to process, and that represent, other forms of data, e.g. where it is desired to use a graphics texture (and graphics texture processing) to represent and process other forms of data. As is known in the art, textures can be and are used in graphics processing to represent and process many different kinds of data, such as, 3D fog, flow fields, etc. as well as for "traditional" graphics purposes. The technology described herein can equally be applied to, and extends to, these kinds and uses of textures in, and for, graphics processing systems. Thus the texture of the technology described herein may represent other forms of data that are to be processed as a texture in a graphics processing system, if desired.

In an embodiment, the texture data elements each represent a colour value for a texture element, but this is not essential. In an embodiment the texture data elements represent: low dynamic range (LDR) texture data with 1, 2, 3 or 4 components per texel (luminance, luminance-alpha, RGB and RGB-alpha, respectively) or high dynamic range (HDR) texture data with 1, 3 or 4 components per texel.

As will be appreciated by those skilled in the art, the actual data values accorded to the texture elements, both in their original, unencoded raw form, and in their encoded form (or at least when the encoded data has been decoded to reproduce a representation of the original data) will depend on the form of "texture" that the texture elements are intended to define or represent.

Thus, for example, where the texture elements define colours to be used, the texture data elements in their original, unencoded form may each comprise a set of colour values (Red, Green, Blue (RGB), a set of colour and transparency values (Red, Green, Blue, Alpha (RGBa)), or a set of luminance and chrominance values, and the encoded data, when decoded (reproduced), will generate a corresponding set of colour values.

In the case of shadow (light)-maps, for example, the texture data elements, will each comprise or represent a set of data values indicating, e.g., whether the texture element is in light or in shadow, and the amount (and/or colour) of the light or shadow for that texture element. Similarly, for a normal-map (bump-map), the data for each texture element will be a set of values indicating the direction in which light will be reflected at that texture element.

The texture data elements could also, e.g., represent z values (depth values), stencil values, luminance values (luminance textures), luminance-alpha-textures, and/or gloss-maps (i.e. whether a surface is shiny at the texture element position or not), etc.

It would be possible, where appropriate for each texture data block to only encode data necessary to generate some, but not all, of the data values necessary to reproduce the original data, with the remaining data values being derived (e.g. therefrom) as part of the data reproduction process. Thus, in one embodiment, the encoded texture data block encodes data representative of some of the original texture data, with data representative of other parts of the original data being derived from the encoded data during the decoding process.

For example, in the case of normal-maps, it would be possible for the encoded texture data to, e.g., only encode two of the normal direction components (e.g. dx and dy), with the third component (dz) being derived from these two values when the data is decoded (since it is known that the sum of the squares of the components must be 1 (as they define a normal vector of length 1): $1=dx^2+dy^2+dz^2$).

It should be noted here that references herein to "colours" or "luminances", etc., accordingly refer to, as will be appreciated by those skilled in the art, a set of data values that allow the colour or luminance, etc., in question to be reproduced, e.g., on a display. These data values may comprise any suitable set of colour or luminance, etc., data, such as a set of RGBa values as discussed above. Equally, references to generating a set of data values for an encoded texture data block, and to data values for individual texture elements, encompass data values that each comprise or include a combination of values, such as a set of colour values (RGB or RGBa), as appropriate.

The set or array of texture data elements that is encoded in accordance with the technology described herein can be any suitable or desired such set. For example, the encoded texture data block could, if desired, represent the entire texture map to be reproduced.

However, in an embodiment, each texture data block encodes a smaller portion (or block) of the texture map in question, as in traditional block encoding techniques. In such a case, the texture data block will encode and represent a selected set or array of the original texture data elements. Each texture data block in an embodiment encodes a 4×4, 5×5, 6×6, 8×8, 10×10, 12×12, 3×3×3, 4×4×4, 5×5×5 or 6×6×6 array of texels. (It is an advantage of the technology described herein that it can support many different block sizes.)

It will be appreciated that in such arrangements, a plurality of such individual texture data blocks will be needed to encode the overall set of original texture data (texture data elements), e.g. make-up the entire texture map. Thus, in an embodiment, the technology described herein further includes subdividing a set of texture data elements (e.g. for a texture map) into a plurality of sub-sets of texture data elements, and then encoding each sub-set of texture data elements as a texture data block in accordance with the technology described herein. In such an arrangement, in an embodiment the texture map being encoded is divided into blocks of equal size, i.e. each sub-set of the texture map represents the same number (and, e.g., array) of texture data elements. This can, e.g., simplify the task of finding which block a given texture data element lies in. In an embodiment each encoded texture data block has the same size, i.e. a fixed rate encoding scheme is used for the texture map in question. This facilitates the encoding and decoding processes, as is known in the art. Thus, for example, a texture map could be divided into a plurality of 4×4 texel arrays, with each such array being encoded as a separate texture data block.

Where plural texture data blocks are used to encode a larger texture map (or set or array of texture elements) (or part thereof), the actual subdividing of the array into smaller blocks, and the order of encoding into texture blocks can be selected as desired. In an embodiment the blocks (sub-sets of data) are encoded in raster order, although other arrangements, such as the use of Morton order, would, of course, be possible.

The encoding process of the technology described herein (i.e. to produce a set of encoded data blocks of the form discussed above) can be carried out in any suitable manner on or using the original texture data that is to be encoded. For example, once the predefined partitioning pattern to be used for a block has been selected in the manner of the technology described herein, then as in known prior art processes, the original data for the block could be encoded using the various different encoding possibilities that are available (i.e. that, in effect, an encoded texture data block can represent). This would provide a set of possible encoded blocks that can then be compared with the original data, so as to determine, e.g., which encoded version (block) of the data gives the least error (on reproduction) when compared to the original data (which encoding arrangement can then be selected as the one to use for that original texture data block when it is encoded).

This will be repeated for each different block that the original data (e.g. texture map) has been divided into, to produce a stream or set of encoded texture data blocks representing, and corresponding to, the original set of data (e.g. texture map). (It should be noted here that the set of encoded texture data blocks generated for a texture may (and typically will) include some partitioned blocks and some non-partitioned blocks).

This set of encoded texture data blocks can then be stored, e.g. on a portable storage device such as a DVD, for later use, e.g. when it is desired to apply the texture to an image to be rendered. In an embodiment a texture is encoded as a set of mipmaps, with each mipmap in an embodiment being generated in the manner of the technology described herein.

Each block that the original data (e.g. texture map) is divided into is in an embodiment the same size and configuration. The block size that is being used is in an embodiment provided to the decoder. The block size is in an embodiment not included in the encoded texture data blocks themselves, but is in an embodiment provided to the decoder separately. For example, the block size could be implicitly indicated by another parameter that is provided to the decoder, such as the image type, or included in (and indicated in) a (global) data header that is associated with (attached to) the set of encoded texture data blocks.

(The reverse, decoding, process, i.e. in which the encoded texture data block is used to produce one or more or an array of texture data elements for use in graphics processing will be, as will be appreciated by those skilled in the art, essentially the reverse of the encoding process, and thus comprise, e.g., determining from the encoded texture data block the partitioning pattern that has been used, and the set of data values (e.g. endpoint colours) to be used for each partition in the block, and then generating the data values (e.g. colours) for individual texture data elements accordingly. The so-generated, decoded texel values can then be applied, as is known in the art, to sampling positions and/or fragments that are being rendered to generate rendered data for those sampling positions and/or fragments, which rendered data is then, e.g. written to a frame buffer for a display to display the "textured" sampling positions and/or fragments.)

Although the technology described herein has been described above with particular reference to the encoding (and decoding) of texture data for graphics processing, as will be appreciated by those skilled in the art, it would equally be applicable to the encoding and decoding of other forms of data, and in particular to data that is in the form of (or can be expressed in the form of) arrays or blocks of (similar) data elements (e.g. data elements whose values follow a common or similar format and/or that will be or can be used for a similar or the same purpose or that represent similar information). It is in particular applicable to the encoding of such data where random access to the data is desired.

Such data could comprise, for example, vector-fields used for simulations, data representing flow-directions for fluids or bounce directions for impacts, etc. (which data would, for example, be analogous to the normal-maps (bump-maps) discussed above in relation to graphics data), heat-maps, or sound data, etc.

In such arrangements, the data can be encoded (and decoded) in an analogous manner to the texture data as described herein.

Thus, another embodiment of the technology described herein comprises a method of determining which one of a set of plural predefined partitioning patterns to use to divide data elements of a block of data elements to be encoded into separate partitions within the block for encoding purposes, the method comprising:
- generating a reference partitioning pattern for the block of data elements using a partitioning function;
- comparing some or all of the predefined partitioning patterns in the set of plural predefined partitioning patterns to the generated reference partitioning pattern; and
- selecting one of the predefined partitioning patterns in the set of plural predefined partitioning patterns as the partitioning pattern to use when encoding the block of data elements on the basis of the comparison.

Another embodiment of the technology described herein comprises an apparatus for determining which one of a set of plural predefined partitioning patterns to use to divide data elements of a block of data elements to be encoded into separate partitions within the block for encoding purposes, the apparatus comprising:
- processing circuitry configured to generate a reference partitioning pattern for the block of data elements using a partitioning function;
- processing circuitry configured to compare some or all of the predefined partitioning patterns in the set of plural predefined partitioning patterns to the generated reference partitioning pattern; and
- processing circuitry configured to select one of the predefined partitioning patterns in the set of plural predefined partitioning patterns as the partitioning pattern to use when encoding the block of data elements on the basis of the comparison.

Another embodiment of the technology described herein comprises a method of encoding a set of data elements as a block of data representing the data elements, comprising:
- generating a reference partitioning pattern that will divide the data elements in the encoded block of data elements into separate partitions within the block using a partitioning function;
- comparing some or all of the predefined partitioning patterns in a set of plural predefined partitioning patterns to be used to divide data elements of a block of data elements to be encoded into separate partitions within the block for encoding purposes with the generated reference partitioning pattern;
- selecting one of the predefined partitioning patterns in the set of plural predefined partitioning patterns as the partitioning pattern to use when encoding the set of data elements on the basis of the comparison; and
- encoding the set of data elements as a block of data representing the data elements using the selected predefined partitioning pattern.

Another embodiment of the technology described herein comprises an apparatus for encoding a set of data elements as a block of data representing the data elements, comprising:
- processing circuitry configured to generate a reference partitioning pattern that will divide the data elements in the encoded block of data elements into separate partitions within the block using a partitioning function;
- processing circuitry configured to compare some or all of the predefined partitioning patterns in a set of plural predefined partitioning patterns to be used to divide data elements of a block of data elements to be encoded into separate partitions within the block for encoding purposes with the generated reference partitioning pattern;
- processing circuitry configured to select one of the predefined partitioning patterns in the set of plural predefined partitioning patterns as the partitioning pattern to use when encoding the set of data elements on the basis of the comparison; and
- processing circuitry configured to encode the set of data elements as a block of data representing the data elements using the selected predefined partitioning pattern.

As will be appreciated by those skilled in the art, these embodiments of the technology described herein can and in an embodiment do include any one or more or all of the features of the technology described herein described herein, as appropriate. Thus, for example, the partitioning pattern selection process is in an embodiment carried out in the manner discussed above.

The methods and apparatus of the technology described herein can be implemented in any appropriate manner, e.g. in hardware or software, and in (and be included in) any appropriate device or component. In an embodiment they are implemented in a processor, and thus the technology described herein also extends to a processor configured to use the methods of the technology described herein, or that includes the apparatus of the technology described herein. In an embodiment, the methods and apparatus of the technology described herein are implemented in hardware, in an embodiment on a single semi-conductor platform.

The technology described herein can be implemented in any suitable system, such as a suitably configured microprocessor based system. In an embodiment, the technology described herein is implemented in a computer and/or microprocessor based system.

The various functions of the technology described herein can be carried out in any desired and suitable manner. For example, the functions of the technology described herein can be implemented in hardware or software, as desired. Thus, for example, the various functional elements, processing circuitry, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and processing circuitry, and/or programmable hardware elements and processing circuitry that can be programmed to operate in the desired manner. The various functional elements, etc., may be separate to each other or may share circuitry (e.g. be performed by the same processor), as desired.

It should also be noted here that, as will be appreciated by those skilled in the art, the various functions, etc., of the technology described herein may be duplicated and/or carried out in parallel on a given processor.

In some embodiments the data processing system, graphics processing system, data processors, graphics processors, processing circuitry, apparatus, etc., may be in communication with memory and/or one or more memory devices that store the data described herein, such as the data (e.g. the input and/or output data) for the data element and encoded data blocks, the partitioning patterns referred to herein, etc., and/or that store software for performing the processes described herein. The data processing system, graphics processing system, data processors, graphics processors, processing circuitry, apparatus, etc., may also be in communication with a display for displaying images based on the generated data blocks.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising data processing circuitry causes in conjunction with said data processing circuitry said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

An embodiment of the technology described herein will now be described with reference to the encoding of texture data for use in graphics processing that is in the form of a colour map (i.e. colour data). However, as discussed above, and as will be appreciated by those skilled in the art, the technology described herein is applicable to data encoding in general, and so therefore should not be considered to be limited to the present example of texture colour data encoding.

FIG. 1 illustrates the basic encoding process of this embodiment. As shown in FIG. 1, an original image or array 1 of texture data elements (texels) (a texture "map") is subdivided into a plurality of 4×4 texture element blocks 2. (Other block sizes can be used, as will be discussed further below.)

In the present embodiment, as shown in FIG. 1, the original image (texture map) 1 is divided into blocks of equal size. This simplifies the task of finding which block a given texture data element lies in, and gives a constant data rate.

In this embodiment, each texture element (texel) in the original texture map data array (image) represents the colour to be used at the position of the respective texture element, and accordingly has allocated to it a data value comprising a set of colour values (e.g. red, green, blue (RGB), and, optionally alpha (transparency) values. In other words, in this embodiment, the data values that are encoded and generated, etc., each correspond to and represent a colour (a set of colour values). For convenience, the following description will therefore refer primarily to "colours" but it should be understood that such references indicate a data value comprising a set of colour values that represent the colour in question.

In the present embodiment, rather than storing the array of colour data in its full, original form, each 4×4 texture element block 2 is encoded as a texture data block 5 that has a reduced size as compared to the texture data in its original, unencoded form. This, in effect, compresses the original texture data, thereby making its storage and processing easier and more efficient. In the present embodiment, each encoded texture data block 5 uses 128 bits. (Other arrangements would, of course, be possible.)

Each encoded, reduced size, texture data block 5 contains, as will be discussed further below, sufficient and appropriate data to allow data corresponding to or representing the original, unencoded, data of the 4×4 texture element block in question to be reproduced.

For each block 2 of the original image (texture map) 1, a corresponding encoded texture data block 5 is generated. The individual texture data blocks making up the texture map are encoded in the present embodiment in raster order. Other arrangements, such as the use of Morton order, would, of course, be possible.

Thus, in the present embodiment, each encoded texture data file comprises a sequence of individual texture data blocks encoding the array of texture data elements (the image data).

The number of texture data blocks in the file will depend on the size of the texture map (texture data array) that is being encoded, and, e.g., whether the data is being stored in mipmap form. If mip-maps are used, then if the first level of texture map resolution is encoded using "n" texture data blocks, there will be "n/4" texture data blocks for the mipmap level below, "n/16" blocks for the next mip-map, "n/64" for the next, "n/256" for the next again, and so on (but no less than one block for each level) until the mip-map level with size 1×1 is reached.

(In the present embodiment, the encoded texture data can be and in an embodiment is stored in the form of mip-maps (i.e. where multiple versions of the original texture data array, each having different levels of detail (resolution), are stored for use). The mip-maps are in an embodiment stored one after each other in memory, with each mip-map level being, as is known in the art, a downscaled (by a factor of 2) representation (image) of the original array (image). The mip-maps are stored in order of descending resolution, i.e. n×n, ..., 16×16, 8×8, 4×4, 2×2, 1×1. The smaller mip-maps (<8×8) are each stored individually in a separate encoded data block.)

Figure 2:
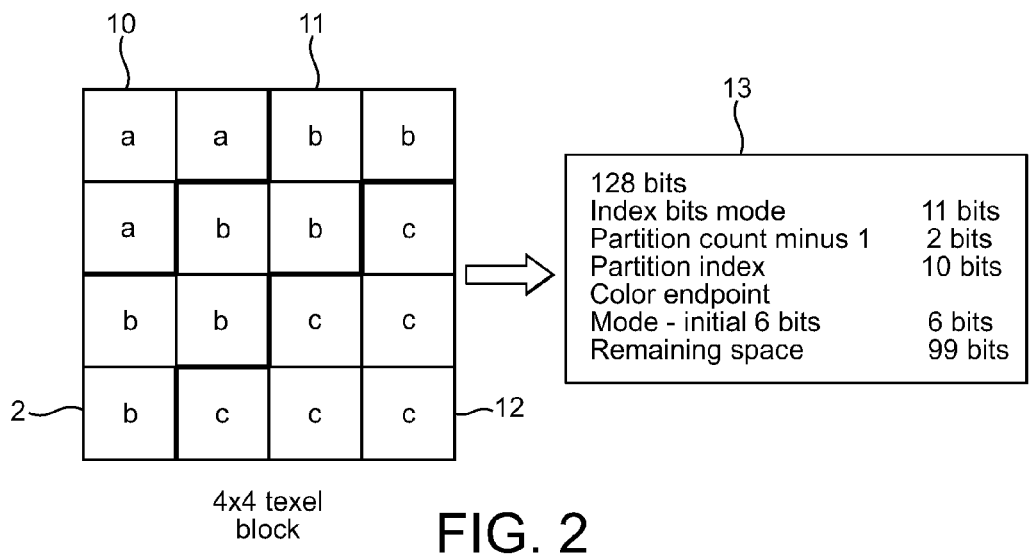
FIG. 2 shows schematically the encoding of a partitioned data block in the described embodiment of the technology described herein.

As discussed above, the technology described herein is directed to arrangements in which the texture data elements (texels) in a given texel block to be encoded are divided into different partitions (sub-sets) within the block. FIG. 2 illustrates this, and shows a 4×4 texel block 2 which has been divided into three partitions 10, 11 and 12. Thus the texels labelled "a" in FIG. 2 belong to a first partition 10, the texels labelled "b" belong to a second partition 11, and the texels labelled "c" belong to a third partition 12. This block is then encoded in a compressed form as an encoded texture data block 13, but with, as will be explained in more detail below, additional information relating to the partitioning of the original 4×4 texel block.

FIGS. 12 to 15 show schematically the way that a predefined partitioning pattern to use for a block of texture data elements to be encoded is selected in the embodiment of the technology described herein (and in accordance with the technology described herein).

It is assumed here that the texture encoding scheme supports the use of a set of predefined partitioning patterns for texel blocks to be encoded. In the present embodiment, this set of predefined partitioning patterns is derived and determined by, as will be discussed further below, a partitioning pattern generation function. However, other arrangements, such as for there simply to be a stored set of predefined partitioning patterns for use by the texture encoding scheme could be used, if desired.

The technology described herein and the present embodiments address the issue of selecting which of the available (supported) predefined partitioning patterns to use for a given texel block to be encoded.

Figure 12:
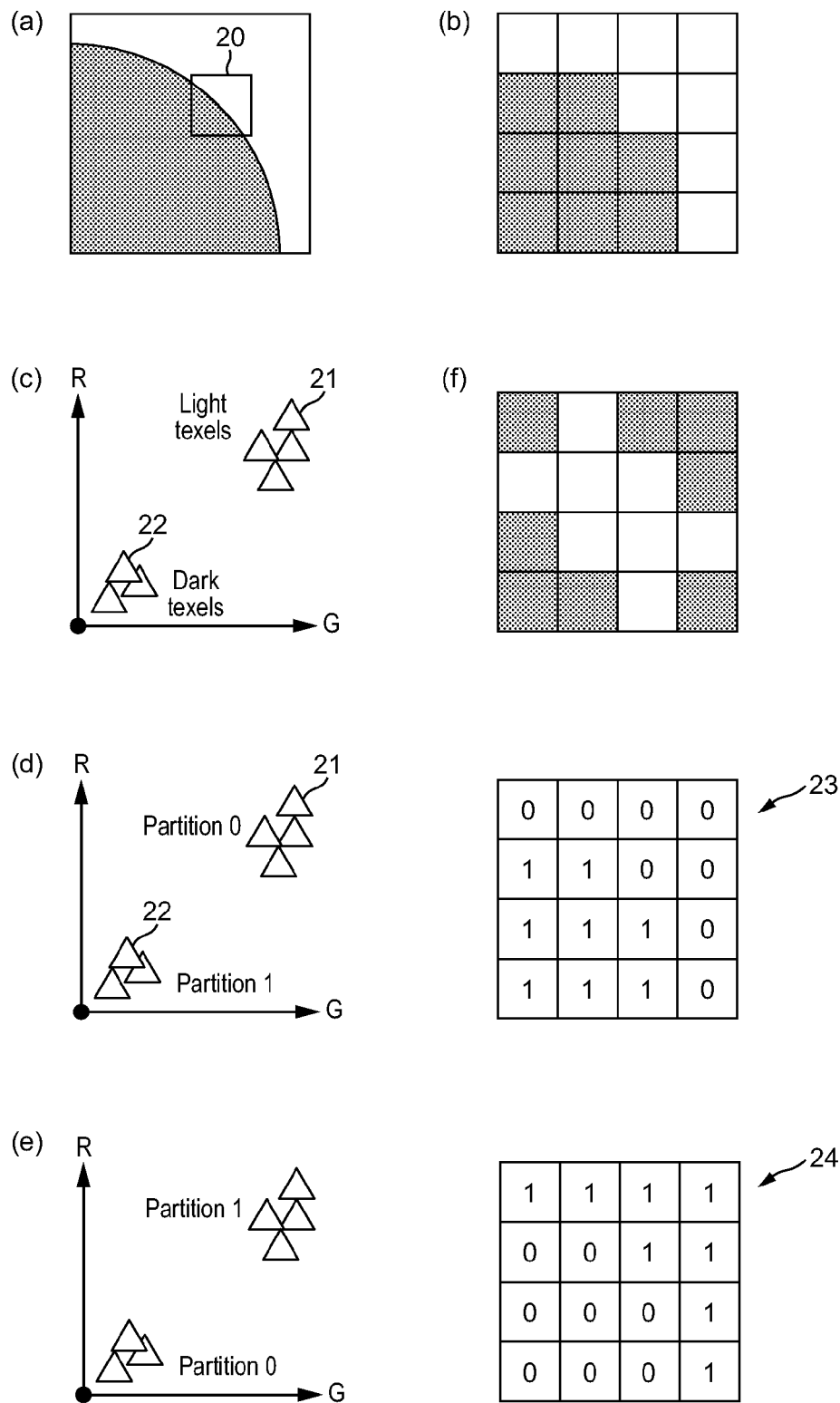
Figure 13:
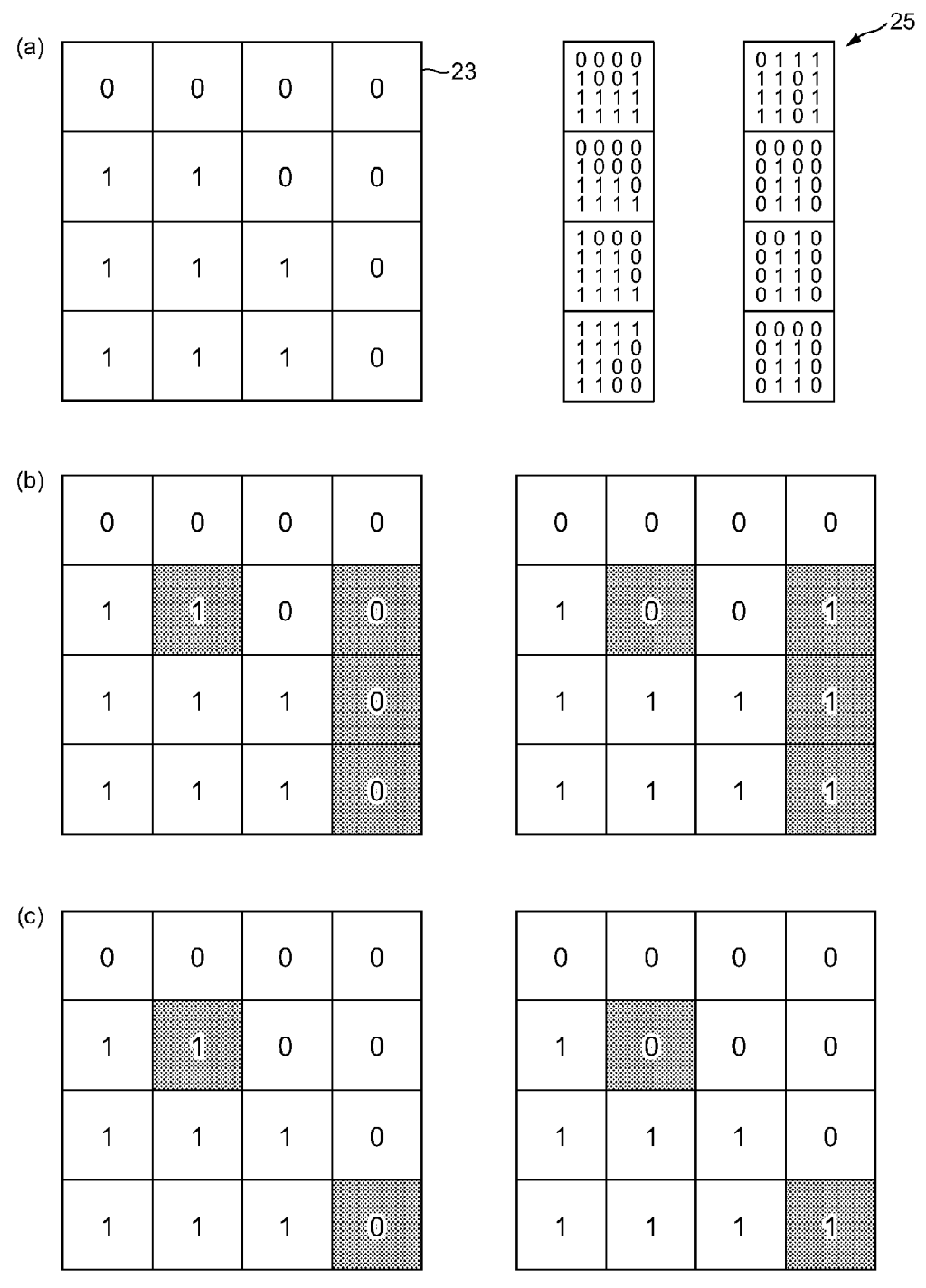
Figure 13:
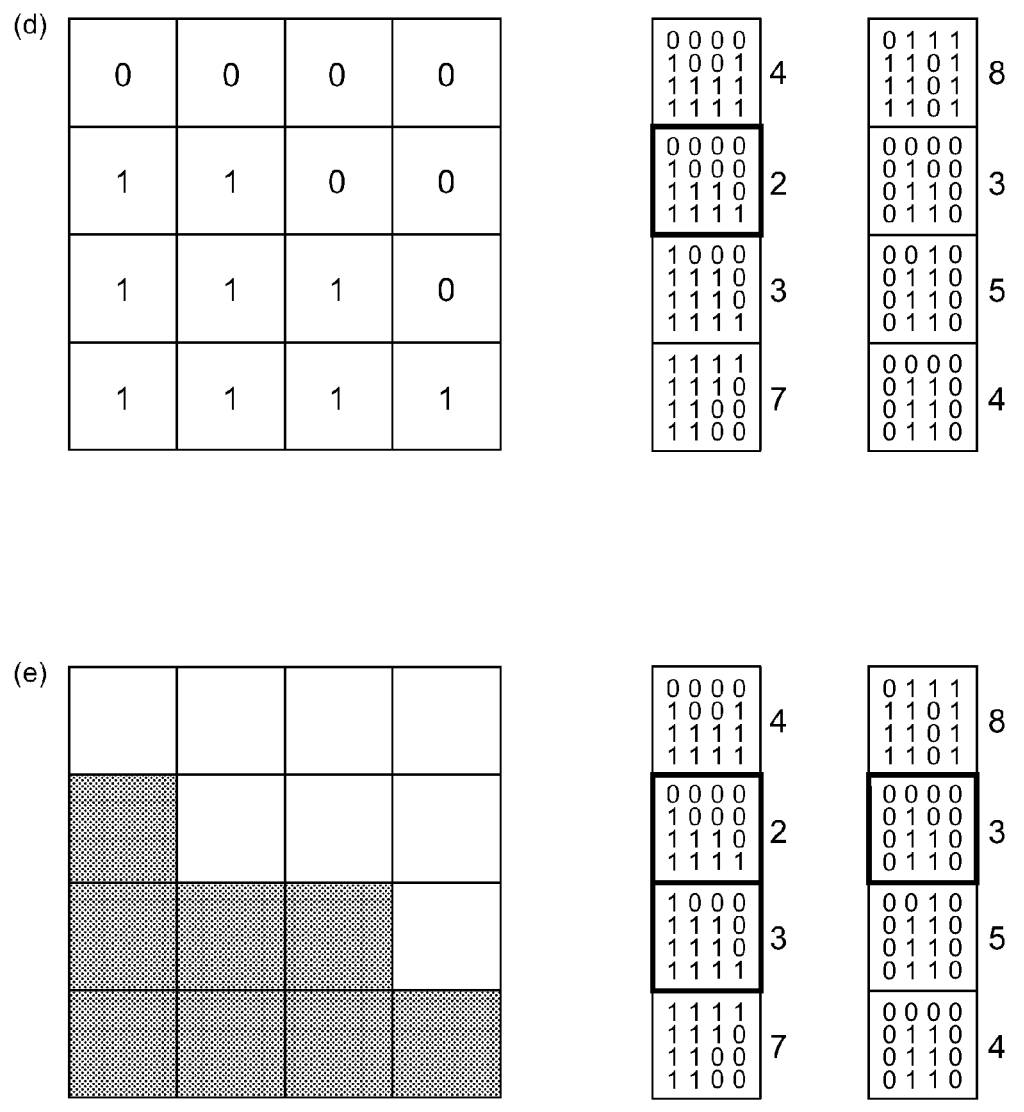
Figure 14:
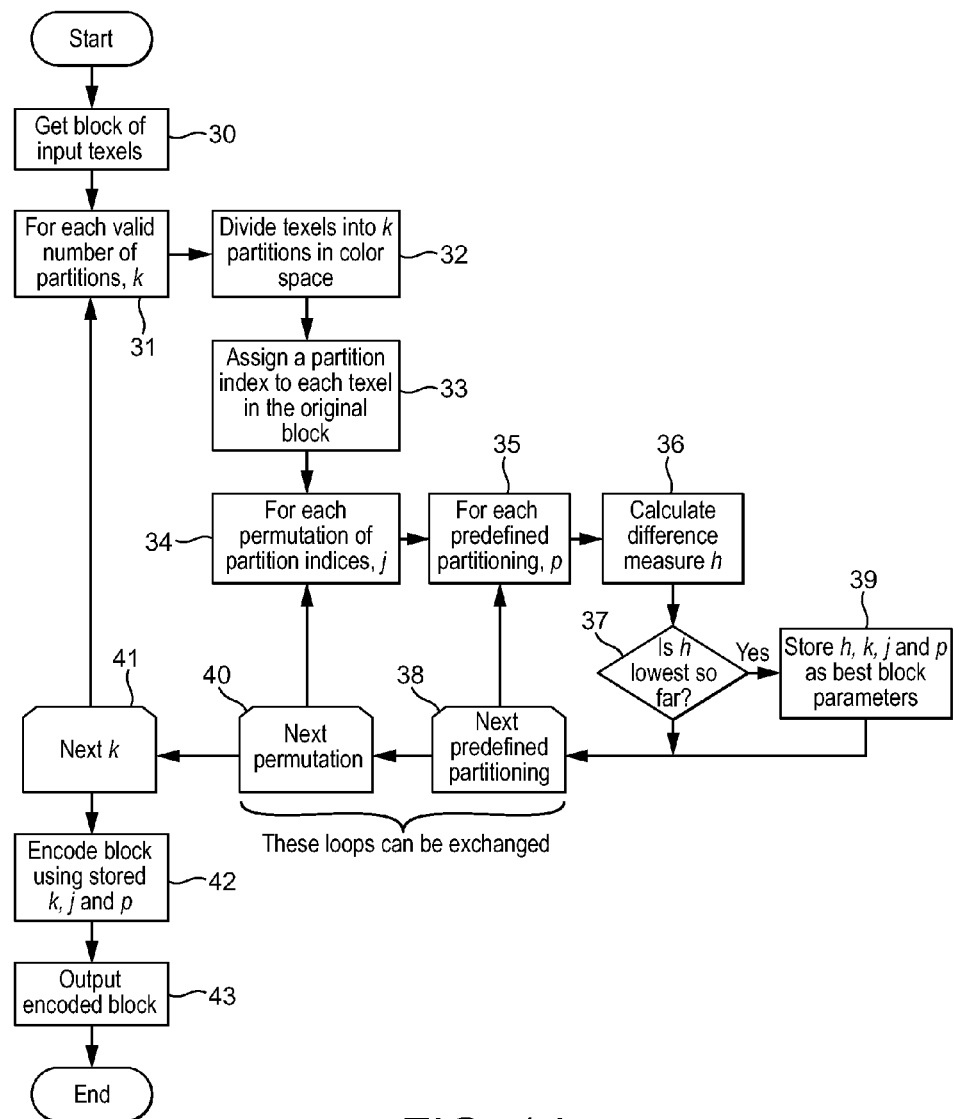
Figure 15:
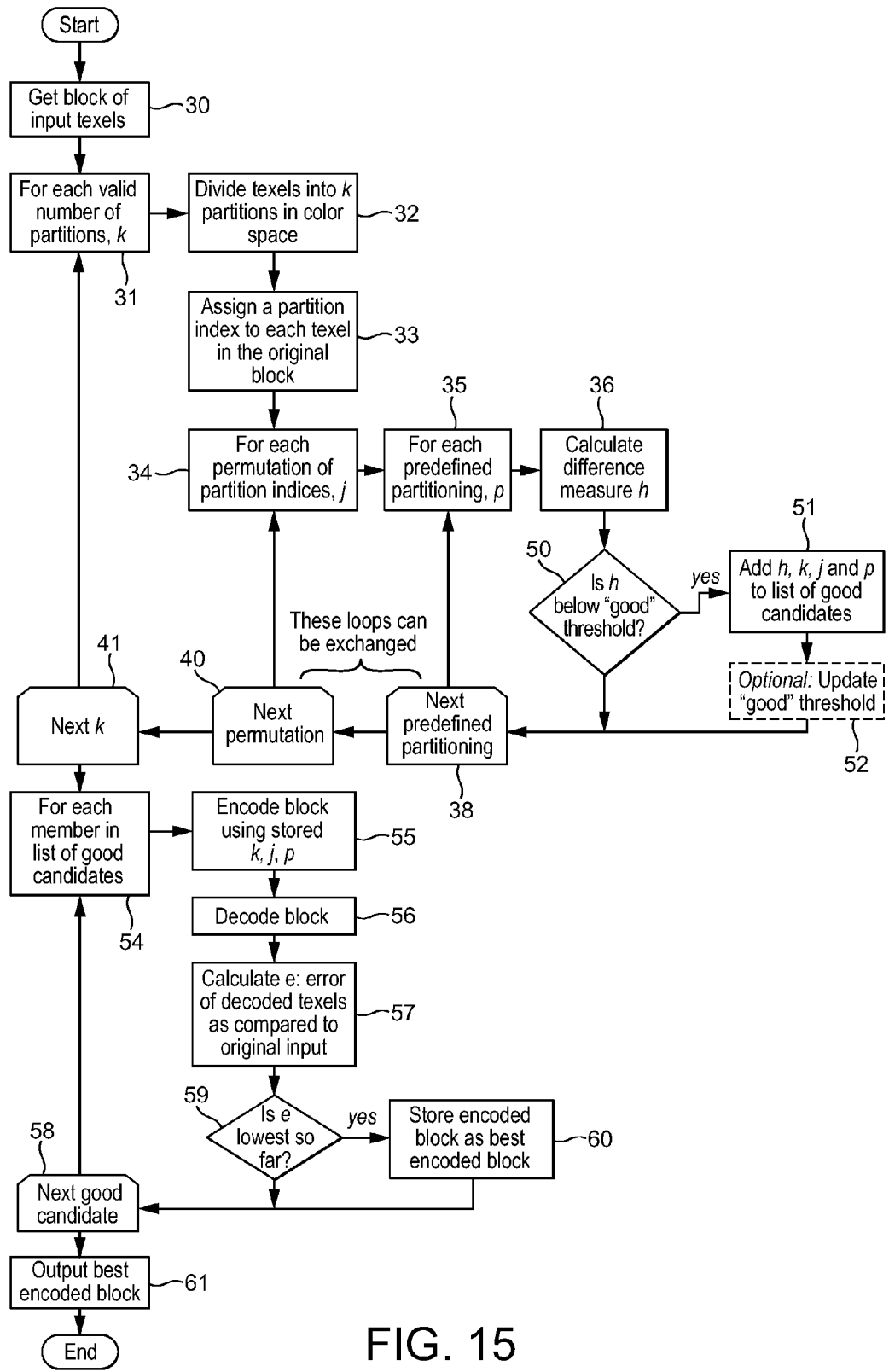

FIGS. 12 and 13 illustrate schematically this process, and FIGS. 14 and 15 are flowcharts showing the steps of the process.

The selection of which predefined partitioning pattern to use for a given texel block starts, in the present embodiment, by deriving a reference partitioning pattern for the block without reference to (and not constrained by) the set of predefined partitioning patterns that are supported. This process is illustrated in FIG. 12.

FIG. 12(a) shows an exemplary texel block 20 to be encoded, which block 20 at the "texel" level will be as shown in FIG. 12(b) (where the texture is encoded as 4×4 blocks of texels).

The present embodiment uses a partitioning function to partition the data values for the texels in the block 20 into a number of data value partitions. This is illustrated in FIG. 12(c) for the case where the texel values in the block 20 are divided into two texel value partitions, i.e. a partition of "light" texel values 21 and a partition of "dark" texel values 22.

It should be noted here that as shown in FIG. 12(c), this partitioning of the texel values is done within the colour space. (FIG. 12(c) shows the colour space as RG. The colour space is typically RGB, but B has been omitted for clarity). Also, because the partitioning is being done in the colour space, the "spatial" positions of the texels in the block 20 does not affect the partitioning. (Thus the texel pattern shown in FIG. 12(f) would still be partitioned as shown in FIG. 12(c), as it has the same distribution of colours (texel values) as the block 20, notwithstanding the different spatial distribution of the texel colours within the block.)

The texel value partitioning operation in the present embodiment uses the k++-means method to initialise a k-means clustering process which is used on the texel colour values directly to partition the texel values into different texel value partitions as illustrated in FIG. 12(c). Other data value clustering methods, such as k-means modified to cluster around lines rather than cluster centres, or the k-medioid method, or other variations, could be used if desired.

Also, although FIG. 12(c) shows partitioning of the texel values into two data value partitions, it would be possible to generate other partitionings, for example having more data value partitions, if desired. Indeed, in an embodiment, a number of different partitionings, each having different numbers of data value partitions, are generated.

Once the data value partitions have been determined, then the individual texels in the texel block are sorted into their respective partitions based on their data (colours) values, so as to give a reference partitioning pattern for the texel block. This is illustrated in FIGS. 12(d) and 12(e).

Thus, as shown in FIG. 12(d), for example, if the light texels 21 are assigned to partition 0, and the dark texels 22 are assigned to data value partition 1, the corresponding reference partitioning pattern 23 for the texel block will be as shown.

As shown in FIG. 12, because the labelling of the data value partitions as being partition 0 or partition 1 (in this case) is arbitrary, a reference partitioning pattern for the other possible partition labelling permutation is also generated. This is illustrated by the reference partitioning pattern 24 shown in FIG. 12(e).

Where more than two possible permutations are possible (which will be the case, for example, where there are three data value partitions (which will give 6 permutations), or four partitions (which will then give 24 permutations), and so on), then a reference partitioning pattern is generated for each possible partition labelling permutation.

It can be seen from FIGS. 12(d) and (e), that the reference partitioning patterns in effect generate an "ideal" partitioning for the texel block being encoded.

Once the reference partitioning patterns have been generated as shown in FIG. 12, the set of predefined partitioning patterns that the encoding scheme supports is then compared to those reference partitioning patterns to determine which one of the predefined set of partitioning patterns matches most closely to one of the reference partitioning patterns.

FIG. 13 illustrates this process. Thus FIG. 13(a) shows the reference partitioning pattern 23 shown in FIG. 12(d) together with a set of predefined partitioning patterns 25 that it is to be compared with. These predefined partitioning patterns 25 may be stored, for example, in a table, or generated using a partitioning pattern generation function. (Only those predefined partitioning patterns that have the same number of partitions as a respective reference partitioning pattern are compared with that respective reference partitioning pattern.)

As shown in FIG. 13, the predefined partitioning patterns 25 are compared with the generated reference partitioning pattern 23 to assess how similar each predefined partitioning pattern is to the reference partitioning pattern 23.

In the present embodiment, this is done by identifying how many partition index "mismatches" there are between the two patterns being compared. Thus the indices for each respective texel position in the predefined partitioning pattern are compared with the partition index for that corresponding texel position in the generated reference partitioning pattern, and the number of mismatches at corresponding texel positions identified and counted.

As shown in FIG. 13(b), in the present example the first predefined partitioning pattern 0 has four mismatches with the generated reference partitioning pattern 23 shown in FIG. 12 (d).

As shown in FIG. 13(c), a similar comparison is made with the second predefined partitioning pattern 1, but in this case there is a better match, as there are only two mismatches.

This process is repeated for each predefined partitioning pattern, to derive a difference measure for each respective predefined partitioning pattern when compared to the generated reference partitioning pattern.

The process is then repeated for each respective reference partitioning pattern that has been generated.

Then, as shown in FIGS. 13(d) and 13(e), the predefined partitioning pattern to use can be chosen as being the predefined partitioning pattern that best matches the generated reference partitioning pattern (FIG. 13(d)), or, alternatively, a small set of good matches from the predefined partitioning patterns can be chosen as a set of "good candidates" that are then tested further (e.g. more thoroughly and more exhaustively) to determine which of those "good candidates" is the best predefined partitioning pattern to use (FIG. 13(e)).

In the present embodiment the comparisons to determine the similarity between the predefined partitioning patterns and the generated reference partitioning pattern are carried out by computing the Hamming distance for each respective pair of patterns being compared.

As shown in FIGS. 12 and 13, the output from the reference partitioning pattern generation step consists of an array of partition indices, one for each texel. This is then compared against the array of partition indices stored for each predefined partitioning pattern to determine the Hamming distance between the two arrays.

The present embodiment uses the Hamming distance for this purpose as it is a measure which is easy to compute. The Hamming distance between two arrays of equal length is the number of positions at which the corresponding elements of each array are different. It can easily be calculated by iterating across all elements of one array, comparing each element with the corresponding element in the other array, and counting those which are not equal.

Using the Hamming distance is particularly advantageous for the 2-partition case, as each partition index can only be 0 or 1, which can be represented by a single bit. If the arrays are packed as bits into a single value, the difference determination can then be performed using an XOR operation, in which a bit of the result is set if the corresponding bits of the input are different. The number of bits set in the result can then be counted, which is the Hamming distance, h. If the two input arrays are packed into values a and b, then h can be computed as:

$c = a$ XOR $b$ $h$=count bits in $c$

The XOR operation can also be used in the 3- and 4-partition cases if the partition indices are packed into pairs of adjacent bits, and an additional step of combining the pairs of bits in the result using an OR operation is used before bit counting proceeds. Thus:

$c = a$ XOR $b$ $d = c$ AND 0101010101 . . .

$e = c$ AND 1010101010 . . .

$f = e$ shifted right by 1 place $g = d$ OR $f$ $h$=count bits in $g$

Similar functions can be constructed for any number of partitions.

As discussed above, since the labelling of the partitions in the generated reference partitioning patterns is arbitrary, each permutation of partitions must be tested. The minimum Hamming distance to any permutation is then used as the final similarity measure. (For example, if the partitioning step identifies four black (B) and four white (W) pixels interleaved as follows: WWWBWBBB, then either black or white can be assigned to partition 0, leading to two permutations of reference pattern partitioning: 00010111 and 11101000. When compared against a predefined partitioning pattern which may have the pattern 11100000, the Hamming distance to the first permutation will be 7, and to the second permutation will be 1. From this, it can be seen that black pixels should be assigned to partition 0 and white to partition 1, and that the predefined partitioning pattern is a pretty good match (as it has a minimum Hamming distance of 1).)

FIGS. 14 and 15 are flowcharts that illustrate the above processes.

FIG. 14 shows the basic predefined partitioning pattern selection operation.

At step 30 the block of input texels to be encoded is received. Then, in steps 31, 32 and 33, a reference partitioning pattern or patterns are generated by, for each desired number of partitions, k (step 31), dividing the texel values into the corresponding number of partitions in colour space (step 32), and assigning a partition index to each texel in the original block based on the texel's value (step 33).

Then, as shown in steps 34-38, for each permutation of partition indices (step 34), the difference between each predefined partitioning pattern and the generated reference partitioning pattern is calculated (steps 35 and 36), and it is determined whether the current predefined partitioning pattern has the lowest difference measure (step 37). If so, the parameters for that predefined partitioning pattern are stored as being the best predefined partitioning pattern found (so far) to use for the block (step 39). This is repeated for each predefined partitioning pattern that is being considered (step 38).

This process is repeated for each different permutation of the reference partitioning pattern in question (step 40), and for each different reference partitioning pattern (in terms of the number of partitions) that has been generated (step 41).

Once all the predefined partitioning patterns have been compared to the reference partitioning patterns in this way, then the predefined partitioning pattern found to have the lowest difference measure to a reference partitioning pattern at (step 37) is used to encode the block of input texels (step 42), which can then be output for use (step 43).

FIG. 14 shows the operation where a single "best match" predefined partitioning pattern is identified and selected as the partitioning pattern to use following the comparison process (i.e. the arrangement illustrated in FIG. 13(*d*)).

However, as discussed above, an alternative arrangement, as illustrated in FIG. 13(*e*), is to use the comparison process to identify a set of "good candidate" predefined partitioning patterns, and to then test those candidate predefined partitioning patterns further.

FIG. 15 illustrates this process.

The first part of FIG. 15 is the process of comparing the predefined partitioning patterns with the generated reference partitioning patterns. As can be seen, these steps are essentially the same as those carried out in FIG. 14 (and so will not be described again in detail here), save that instead of simply identifying the predefined partitioning pattern having the lowest difference measure, all those predefined partitioning patterns having a difference measure that is below a selected threshold are selected and then added to a list of "good candidate" predefined partitioning patterns that are to be subjected to further testing (steps 50 and 51). Optionally, the "good threshold" can be updated as the list of good candidates is generated (step 52) if desired.

As shown in FIG. 15, once all the predefined partitioning patterns have been compared with the generated reference partitioning patterns, and the list of "good candidates" has been determined, each predefined partitioning pattern in the list of good candidates is then subjected to further testing as shown in the rest of FIG. 15.

In the present embodiment, the further testing is done by actually encoding the block using the candidate predefined partitioning pattern (step 55), then decoding the so-encoded block (step 56), and then calculating the error between the decoded texels as compared to the original input block (step 57). This is repeated for each predefined partitioning pattern in the list of good candidate predefined partitioning patterns (steps 54 and 58), and the candidate predefined partitioning pattern found to have the lowest error as compared to the original texel block is selected as being the predefined partitioning pattern to use when encoding the texel block (steps 59, 60 and 61).

In these arrangements, the error between the encoded block using the predefined partitioning pattern and the original texel block is determined using a measure of the peak signal to noise ratio or a perceptually weighted noise measure. Other arrangements would, of course, be possible.

The above describes the process of the embodiment for determining which of the available predefined partitioning patterns should be used for a given texel block to be encoded. As will be appreciated by those skilled in the art, as well as determining which of the predefined partitioning patterns to use, the texel block will otherwise need to be encoded in a suitable manner to allow a decoder to decode the texel block to reproduce (at least an approximation to) the original texel values.

The format for encoding (and decoding) a block of texture data elements (texels) that is used in the present embodiment will now be described.

Overview

The present embodiment uses a texture compression format designed to provide lossy texture compression suitable for a wide range of different types of content and a wide range of quality/bitrate tradeoffs. The format has the following main features:

128-bit block size
an encoded block is self-contained (any given texel is completely defined by the contents of a single block)
Designed for compression of the following types of texture data:
    LDR (low dynamic range) texture data with 1, 2, 3 or 4 components per texel (Luminance, Luminance-Alpha, RGB and RGB-Alpha, respectively)
    HDR (high dynamic range) texture data with 1, 3 or 4 components per texel
Fine-grained per-block adjustable bit-allocation between index bits and color endpoint bits.
2D and 3D variants.
Each block represents a rectangular or cuboidal footprint of texels. The footprint size determines the bit-rate of this texture format and is global for the texture as a whole.
Supported footprint sizes for 2D variants are:
4×4 (8 bpp)
5×4 (6.40 bpp)
5×5 (5.12 bpp)
6×5 (4.27 bpp)
6×6 (3.56 bpp)
8×5 (3.20 bpp)
8×6 (2.67 bpp)
10×5 (2.56 bpp)
10×6 (2.13 bpp)
8×8 (2 bpp)
10×8 (1.60 bpp)
10×10 (1.28 bpp)
12×10 (1.07 bpp)
12×12 (0.88 bpp)
Supported footprint sizes for 3D variants are:
3×3×3 (4.74 bpp)
4×3×3 (3.56 bpp)
4×4×3 (2.67 bpp)
4×4×4 (2 bpp)
5×4×4 (1.60 bpp)
5×5×4 (1.28 bpp)
5×5×5 (1.02 bpp)
6×5×5 (0.85 bpp)
6×6×5 (0.71 bpp)
6×6×6 (0.59 bpp)
The types of texture data supported (component count, LDR vs HDR) is not dependent on footprint size; all types are available at all sizes.
Block partitioning, with a partitioning pattern generation function; each partition has a separate pair of endpoint colors. The format allows different partitions within a single block to have different endpoint types. The format supports 1 to 4 partitions per block.
Index decimation: The format allows indices to be specified for only some texels, with an infill procedure used for the remaining texels; this is especially useful at lower bitrates.
Void extents: The format offers an encoding to indicate large empty regions within the texture.
The ability to use different data rates for different mipmap levels.

Layout of the Block

If partitioning is disabled for the block, then the encoded block has the following format:

| Bits | Usage |
|---|---|
| 10:0 | Index Bits Mode |
| 12:11 | "00" |
| 16:13 | Color Endpoint Mode |
| 127:17 | Remaining Space |

If partitioning is enabled, the encoded block has the following format:

| Bits | Usage |
|---|---|
| 10:0 | Index Bits Mode |
| 12:11 | Partition count minus 1 |
| 22:13 | Partition index |
| 28:23 | Color Endpoint Mode, initial six bits |
| 127:29 | Remaining Space |

The "Remaining Space" is used to hold Index Data (from the top down), Color Endpoint Data (from the bottom up) and Color Endpoint Mode bits (if more than 6 bits are needed). The sizes of the Index Data, the Color Endpoint Data and the Color Endpoint Mode bits are not fixed, but are instead computed based on Index Bit Mode and the initial six bits of Color Endpoint Mode.

As a special case, if bits[8:0] of the encoded block are "111111100", then the block does not encode ordinary compressed content; instead, it encodes a Void-Extent Block.

Partitioning

An encoded block is subdivided into 1, 2, 3 or 4 partitions, with a separate color endpoint pair for each partition. The number of partitions is specified by the "Partition count minus 1" bits.

If 2 or more partitions are used, then the partition index is used to select one of 1024 partitioning patterns; the set of patterns supported depends on the partition count and block size.

The partitioning patterns are produced with a generator function; this enables a very large set of partitioning patterns for different block sizes to be implented with a minimal number of gates. The details on how the generator works in this embodiment are given below.

Index Modes

The "Index Bits Mode" field controls the number of indexes present, as well as the range used for them. The set of possible combinations depend on the block dimensionality (2D or 3D).

The actual indexes in the block are stored are follows:
  First, they are encoded using the Integer Sequence Encoding method described below.
  The resulting bit-sequence is then bit-reversed, and stored from the top of the block downwards.

Usage of Indexes

The indexes are used to interpolate between two endpoint colors for each texel. First, they are scaled from whatever interval (range) they were supplied in to the range 0.1; the resulting value is then used as a weight to compute a weighted sum of the two endpoints. Any suitable unquantization procedure for the scaling to the 0.1 range can be used.

Index Infill

Each texel that the block encodes has a corresponding index to be used for that texel. In some of the index modes, one index is supplied for every texel in the block; in others, the number of indexes is less than the number of texels. In the latter case, the indexes that are actually to be used for the texels are derived by bilinear (or simplex or trilinear, for 3D blocks) interpolation from the indexes that are supplied (encoded) in the block. Thus, when the index count is smaller than the number of texels in the block, the actual indexes to be used for the texels of the block are derived by bilinear (or simplex or trilinear) interpolation from the index values supplied in the encoded block, i.e. the index for a texel will be computed as an appropriately weighted sum of 2, 3 or 4 (or more) of the indexes supplied (included) in the encoded block.

Thus, in the present embodiment, where an encoded texture data block includes fewer indices than the number of texels the block represents, the encoded texture data block will include a set of index values representing an array of index values at a given resolution that is less than the resolution of the array of texture data elements that the block represents, and then the index values to use for the array of texture data elements that the block represents are derived in use by bilinear (or simplex or trilinear) interpolation from the array of index values that is encoded (included) in the encoded texture data block. For example, an encoded block encoding an 8×8 array of texels may encode (include) only a 5×5 array of index values.

Other arrangements, such as using look-up tables, and/or using predefined index infill patterns (which may be derived, e.g. using a predefined infill pattern generation function, or stored explicitly, e.g. in look-up tables), to derive any "missing" texel indexes can also or instead be used if desired.

Index Planes

Depending on the Index Bits mode selected, the format may offer 1 or 2 index planes. In the case of 2 index planes, two indexes rather than just one are supplied for each texel that receives indexes. Of these two indexes, the first one is used for a weighted sum of three of the color components; the second is used for a weighted sum of the fourth color component. If only 1 index plane is present, it applies to all four color components.

If two index planes are used, then a 2-bit bitfield is used to indicate which of the color components the second index plane applies to. These two bits are stored just below the index bits, except in the case where leftover color endpoint type bits are present; in that case, these two bits are stored just below the leftover color endpoint type bits.

This two-bit bitfield has the following layout:

| Value | Meaning |
|---|---|
| 0 | Red |
| 1 | Green |
| 2 | Blue |
| 3 | Alpha |

If index infill is present while two index planes are being used, then index infill is performed on each index plane separately.

Index Modes

The Index Mode field specifies the width, height and depth of the grid of indices, what range of values they use, and whether dual index planes are present. Since some these are not represented using powers of two (there are 12 possible index widths, for example), and not all combinations are allowed, this is not a simple bit packing. However, it can be unpacked quickly in hardware.

The index ranges are encoded using a 3 bit value R, which is interpreted together with a precision bit H, as follows:

Low Precision Range (H = 0)

| R | Index Range | Trits | Quints | Bits |
|---|---|---|---|---|
| 000 | Invalid | | | |
| 001 | Invalid | | | |
| 010 | 0...1 | | | 1 |
| 011 | 0...2 | 1 | | |
| 100 | 0...3 | | | 2 |
| 101 | 0...4 | | 1 | |
| 110 | 0...5 | 1 | | 1 |
| 111 | 0...7 | | | 3 |

High Precision Range (H = 1)

| R | Index Range | Trits | Quints | Bits |
|---|---|---|---|---|
| 000 | Invalid | | | |
| 001 | Invalid | | | |
| 010 | 0...9 | | 1 | 1 |
| 011 | 0...11 | 1 | | 2 |
| 100 | 0...15 | | | 4 |
| 101 | 0...19 | | 1 | 2 |
| 110 | 0...23 | 1 | | 3 |
| 111 | 0...31 | | | 5 |

For 2D blocks, the index mode field is laid out as follows:

| 10 | 9 | 8 | 7 | 6 | 5 | 4 | 3 | 2 | 1 | 0 | Width N | Height M | Notes |
|---|---|---|---|---|---|---|---|---|---|---|---|---|---|
| D | H | B | | A | | $R_0$ | 0 | 0 | $R_2$ | $R_1$ | B + 4 | A + 2 | |
| D | H | B | | A | | $R_0$ | 0 | 1 | $R_2$ | $R_1$ | B + 8 | A + 2 | |
| D | H | B | | A | | $R_0$ | 1 | 0 | $R_2$ | $R_1$ | A + 2 | B + 8 | |
| D | H | 0 | B | A | | $R_0$ | 1 | 1 | $R_2$ | $R_1$ | A + 2 | B + 6 | |
| D | H | 1 | B | A | | $R_0$ | 1 | 1 | $R_2$ | $R_1$ | B + 2 | A + 2 | |
| D | H | 0 | 0 | A | | $R_0$ | $R_2$ | $R_1$ | 0 | 0 | 12 | A + 2 | |
| D | H | 0 | 1 | A | | $R_0$ | $R_2$ | $R_1$ | 0 | 0 | A + 2 | 12 | |
| D | H | 1 | 1 | 0 | 0 | $R_0$ | $R_2$ | $R_1$ | 0 | 0 | 6 | 10 | |
| D | H | 1 | 1 | 0 | 1 | $R_0$ | $R_2$ | $R_1$ | 0 | 0 | 10 | 6 | |
| | B | 1 | 0 | A | | $R_0$ | $R_2$ | $R_1$ | 0 | 0 | A + 6 | B + 6 | D = 0, H = 0 |
| x | x | 1 | 1 | 1 | 1 | 1 | 1 | 0 | 0 | 0 | — | — | Void-extent |
| x | x | 1 | 1 | 1 | x | x | x | x | 0 | 0 | — | — | Reserved |
| x | x | x | x | x | x | 0 | 0 | 0 | 0 | 0 | — | — | Reserved |

Note that, due to the encoding of the R field, as described in the previous page, bits $R_2$ and $R_1$ cannot both be zero, which disambiguates the first five rows from the rest of the table.

For 3D blocks, the index mode field is laid out as follows:

| 10 | 9 | 8 | 7 | 6 | 5 | 4 | 3 | 2 | 1 | 0 | Width N | Height M | Depth Q | Notes |
|---|---|---|---|---|---|---|---|---|---|---|---|---|---|---|
| D | H | B | | A | | $R_0$ | C | | $R_2$ | $R_1$ | A + 2 | B + 2 | C + 2 | |
| | B | 0 | 0 | A | | $R_0$ | $R_2$ | $R_1$ | 0 | 0 | 6 | B + 2 | A + 2 | D = 0, H = 0 |
| | B | 0 | 1 | A | | $R_0$ | $R_2$ | $R_1$ | 0 | 0 | A + 2 | 6 | B + 2 | D = 0, H = 0 |
| | B | 1 | 0 | A | | $R_0$ | $R_2$ | $R_1$ | 0 | 0 | A + 2 | B + 2 | 6 | D = 0, H = 0 |
| D | H | 1 | 1 | 0 | 0 | $R_0$ | $R_2$ | $R_1$ | 0 | 0 | 6 | 2 | 2 | |
| D | H | 1 | 1 | 0 | 1 | $R_0$ | $R_2$ | $R_1$ | 0 | 0 | 2 | 6 | 2 | |
| D | H | 1 | 1 | 1 | 0 | $R_0$ | $R_2$ | $R_1$ | 0 | 0 | 2 | 2 | 6 | |
| x | x | 1 | 1 | 1 | 1 | 1 | 1 | 0 | 0 | — | — | — | | Void-extent |
| x | x | 1 | 1 | 1 | 1 | x | x | x | 0 | 0 | — | — | — | Reserved (except for valid void extent encodings) |
| x | x | x | x | x | x | x | 0 | 0 | 0 | 0 | — | — | — | Reserved |

The D bit is set to indicate dual-plane mode. In this mode, the maximum allowed number of partitions is 3.

The size of the grid in each dimension must be less than or equal to the corresponding dimension of the block footprint. If the grid size is greater than the footprint dimension in any axis, then this is an illegal block encoding and all texels will decode to an error color.

The index range specifies how the index values are used to compute the weightings. In all cases, the value 0 will generate an interpolated value with the value of endpoint 1, and the maximum value (the selected range) generates an interpolated value equal to endpoint 2's value.

For LDR endpoint values, the interpolation is linear. So if M is the maximum allowed value in the range, the actual interpolated value is equal to (1−index/M)*(endpoint value 1)+(index/M)*(endpoint value 2). The division by M is what scales the input values in the range 0 . . . M into weighting values in the range 0 . . . 1. The range therefore selects how many intermediate steps there are between these two values. The more range, the more likely one is able to represent a value closely, but the more bits needed to encode it.

In the present embodiment, the index value is first rescaled so that M is a power of two (in an embodiment 64), so that the costly division by M can be replaced with a relatively cheap multiplication by 64/M, and then a division by 64.

For HDR endpoint values, the interpolation is a logarithmic function, or an approximation thereof. The endpoint values are encoded as logarithms to the base 2 of the original endpoint values. So if M is the maximum allowed value in the range, the interpolated value is the logarithm of the final decoded values, and is equal to (1−index/M)*(endpoint value 1)+(index/M)*(endpoint value 2). The final decoded value is therefore 2 to the power of the interpolated value.

In the present embodiment, the HDR endpoint values are stored as values with a 12 bit floating point representation, and interpolation occurs in a piecewise-approximate logarithmic manner as follows.

The HDR color components from each endpoint, C0 and C1, are initially shifted left 4 bits to become 16-bit integer values and these are first interpolated in the same way as LDR, using the rescaled index value i. The resulting 16-bit value C is then decomposed into the top five bits, e, and the bottom 11 bits m, which are then processed and recombined with e to form the final value Cf:

$$C = \text{floor}((C0*(64-i)+C1*i+32)/64)$$

$$E = (C \& 0xF800) >> 11; \ m = C \& 0x7FF;$$

if $(m<512)\{mt=3*m;\}$ else if $(m>=1536)\{mt=5*m-2048;\}$ else $\{mt=4*m-512;\}$ $$Cf = (e<<10)+(mt>>3)$$

This interpolation is simple to implement in hardware, and is a considerably closer approximation to a logarithmic interpolation than interpolating the integer interpretation of the bit pattern of a floating-point value.

The final value Cf is interpreted as an IEEE FP16 value. If the result is +Inf or NaN, it is converted to the bit pattern 0x7BFF, which is the largest representable finite value.

The index count is used in larger block sizes to indicate how many indexes are actually present in the encoded block. This may be less than the size of the block, in which case the "missing" indexes have to be derived (as discussed above). (For example, a block encoding an 8×8 texel array may only specify a 4×4 grid of indexes, in which case the remaining indexes will be generated using "index infill", as discussed above.)

Color Endpoint Modes

The format of the present embodiment supports 16 Color Endpoint Modes, which are described in more detail later. These endpoint modes are subdivided into 4 classes:
- class 0: one color endpoint pair is specified by 2 integers
- class 1: one color endpont pair is specified by 4 integers
- class 2: one color endpoint pair is specified with 6 integers
- class 3: one color endpoint pair is specified with 8 integers Each of these classes contains 4 Color Endpoint Modes.

In 1-partition mode, the 4-bit Color Endpoint Mode field has the following encoding:

| Bits | Usage |
| --- | --- |
| 1:0 | Endpoint Mode Class |
| 3:2 | Endpoint Mode within class |

In modes with more than 1 partition, the color endpoint mode coding is more elaborate:

First, we have a 2-bit Endpoint Mode Class Pair Selector; this selector is encoded as follows:

| Value | Meaning |
| --- | --- |
| 00 | All endpoint pairs are of same type, this type follows |
| 01 | All endpoint pairs are of class 0 or class 1 |
| 10 | All endpoint pairs are of class 1 or class 2 |
| 11 | All endpoint pairs are of class 2 or class 3 |

If all endpoints are of same type, then this field is followed by a 4-bit field, containing the Color Endpoint Mode used for all partitions. Otherwise, the field is followed by:
- First, one bit per partition indicating which class its endpoint pair belongs to.
- Then, two bits per partition indicating which mode within the class it belongs to.

Thus, for multi-partition modes, the endpoint mode representation may take from 6 to 14 bits. Of these, the 6 first bits are stored just after the partition indexes, and the remaining bits are stored just below the index bits (variable position).

This data layout ensures that the bits that indicate endpoint pair class always appear in fixed locations; this helps decode performance in hardware.

Color Endpoint Representation

The color endpoints themselves are also represented using the Integer Sequence Encoding. The actual range being used is not directly encoded in the block; instead, the following is done:
- From the partition-count and color-mode encodings, the number of integers actually needed for the color encodings is computed. This may be from 2 to 32, in increments of 2. (The lowest count, 2, occurs when using the Two-Luminance endpoint type with a single partition; the highest count, 32, occurs when using the Two-RGBA endpoint type with 4 partitions).
- From the partition-count, color-mode encoding and index-bits-mode, the number of bits needed to represent these data fields is computed; this bit count is then subtracted from the block size in order to obtain the number of bits actually available for the color encodings.
- Then, the largest range whose Integer Sequence Encoding will fit into the available number of bits is determined (and used).

For example, if the space available for color endpoints is 35 bits, and the number of integers actually needed for the color encodings is ten, then the range used will be 0 . . . 9: the Integer Sequence Encoding of ten integers of such a range takes 34 bits, which fits. The next step up would be to use the range 0 . . . 11; for this range, the Integer Sequence Encoding would take 36 bits to encode ten integers, which would not fit.

Integer Sequence Encoding

The Integer Sequence Encoding is a data encoding that is used to encode most of the data in the compressed (encoded) texture data block.

In order to use space efficiently, the encoding format is able to use a non-integer number of bits for its color endpoint and index fields. This is achieved by using trits (items that can take the values 0, 1, 2 (whereas bits can only take the values 0 and 1)), and quints (which can take the values 0, 1, 2, 3, 4). As trits and quints cannot be represented directly in a binary computer the encoding format instead stores trits and quints in a bit representation that allows n trits to be represented with $$\left\lceil \frac{8n}{5} \right\rceil$$

bits and n quints to be represented with $$\left\lceil \frac{7n}{3} \right\rceil$$

bits.

The Integer Sequence Encoding is used to store a sequence of integers within a bounded range. The range used determines how many bits, trits and quints are used to store each integer. The set of supported ranges and their bit/trit/quint allocation is:

| Range | Bits | Trits/Quints |
|---|---|---|
| 0 . . . 1 | 1 | 0 |
| 0 . . . 2 | 0 | 1 trit |
| 0 . . . 3 | 2 | 0 |
| 0 . . . 4 | 0 | 1 quint |
| 0 . . . 5 | 1 | 1 trit |
| 0 . . . 7 | 3 | 0 |
| 0 . . . 9 | 1 | 1 quint |
| 0 . . . 11 | 2 | 1 trit |
| 0 . . . 15 | 4 | 0 |
| 0 . . . 19 | 2 | 1 quint |
| 0 . . . 23 | 3 | 1 trit |
| 0 . . . 31 | 5 | 0 |
| 0 . . . 39 | 3 | 1 quint |
| 0 . . . 47 | 4 | 1 trit |
| 0 . . . 63 | 6 | 0 |
| 0 . . . 79 | 4 | 1 quint |
| 0 . . . 95 | 5 | 1 trit |
| 0 . . . 127 | 7 | 0 |
| 0 . . . 159 | 5 | 1 quint |
| 0 . . . 191 | 6 | 1 trit |
| 0 . . . 255 | 8 | 0 |

Encoding with Bits Only

If the range selected only uses bits, then integers are stored sequentially, with the lowest bit appearing first in the sequence encoding. For example, if you want to encode a sequence of four numbers (a, b, c, d) whose range is 0 . . . 7 and whose bit-representation is ($a=a_2 a_1 a_0$, $b=b_2 b_1 b_0$, $c=c_2 c_1 c_0$, $d=d_2 d_1 d_0$), then the resulting sequence is the 12-bit pattern $d_2 d_1 d_0 c_2 c_1 c_0 b_2 b_1 b_0 a_2 a_1 a_0$ Encoding with Trits If the range selected uses trits, then each integer is broken into two parts before encoding: if the selected range has b bits, then the low part of a given integer x is given by $L = X \bmod 2^b$ and the high part is given by $$H = \left\lfloor \frac{X}{2^b} \right\rfloor$$

The L portion is represented by zero or more bits; the H portion is represented by one trit. The integers are then stored in groups of 5, as follows:

First, a trit H is collected from every integer; this results in 5 trits. These are encoded into a trit-block; the full size of the trit-block is 8 bits.

Then, bits are stored in the sequence in the following order:
First, the low bits for the first integer are stored.
Then, bits[1:0] of the trit-block are stored.
Then, the low bits for the second integer are stored.
Then, bits[3:2] of the trit-block are stored.
Then, the low bits for the third integer are stored.
Then, bit[4] of the trit-block is stored.
Then, the low bits for the fourth integer are stored.
Then bits [6:5] of the trit-block are stored.
Then, the low bits for the fifth integer are stored.
Then, bit [7] of the trit-block is stored.

This operation is repeated for every group of 5 integers, until all the integers in the sequence have been consumed. At encode time, if the number of integers is not a multiple of 5, the integer sequence is padded with 0s until its size becomes a multiple of 5. At decode time, if the number of integers to extract from the sequence is not a multiple of 5, then the sequence's bit representation has a (notionally infinite) string of zero-bits appended. This way, the format only stores bits for the integers actually needed, instead of storing bits for a multiple-of-5 integers.

Decoding of a Trit-Block

Let the trit-block be denoted by b[7:0]. Now, proceed as follows:

- First, we check whether b[4:2] is equal to 3' b 1 1 1 . If it is, then:
  - Set c= { b[7:5], b[1:0]}
  - Set $t_4$= 2 and $t_3$= 2
- Else
  - Set c= b[4:0]
  - If b[6:5]= 2' b 1 1 then
    • Set $t_4$=2 and $t_3$= { 1' b 0 , b[7]}
  - Else
    • Set $t_4$= { 1' b 0, b[7]} and $t_3$= b[6:5]
- If c[1:0]= 2' b 1 1 then
  - $t_2$= 2 , $t_1$= { 1' b 0, c[4]} , $t_0$={c[3], c[2]&~c[3]}
- Else if c[3:2]= 2' b 1 1 then
  - $t_2$= 2 , $t_1$= 2 , $t_0$= c[1:0]
- Else
  - $t_2$ = { 1' b 0, c[4]} , $t_1$= c[3:2] , $t_0$={c[1], c[0]&~c[1]}

This encoding is chosen based on two criteria:
1. It has the property that if only the n lowest trits are nonzero, then only the $$\left\lceil \frac{8n}{5} \right\rceil$$

lowest bits of the trit-block can actually be nonzero.
2. The decoding process has a particularly efficient hardware implementation.

The AND-NOT operation on the lowest bit of to ensures that the trit-block unpacks to a tuple of 5 valid trits for all the 256 possible input values, even though there are only $3^5 = 243$ such tuples.

Example Integer Sequence with Trits

As an example, it will be assumed that 8 integers in the range 0.11 are to be encoded using the Integer Sequence Encoding scheme of the present embodiment, and that these eight integers are {2, 9, 3, 5, 11, 8, 0, 4} First, the integers need to be split them into bits and trits; given that the 0 . . . 11 range has one trit and two bits, the result of this splitting is:

Trits (high part of the numbers): {0, 2, 0, 1, 2, 2, 0, 1}
Bits (low part of the numbers): {01, 01, 11, 01, 11, 00, 00, 00}

Given that there are 8 trits and 16 bits, the encoded Integer Sequence will have $$16 + \left\lceil \frac{8*8}{5} \right\rceil = 29 \text{ bits.}$$

The trits now need to be encoded into two trit-blocks. The low 5 trits are encoded into one trit-block; the high 3 trits are encoded into a second trit-block.

Encoding with Quints

If the range selected uses quints, then each integer is broken into two parts before encoding: if the selected range has b bits, then the low part of a given integer X is given by L=X mod $2^b$ and the high part is given by $$H = \left\lfloor \frac{X}{2^b} \right\rfloor.$$

The L portion is represented by zero or more bits; the H portion is represented by one quint. The integers are then stored in groups of 3, as follows:

First, a quint H is collected from every integer; this results in 3 quints. These are encoded into a quint-block; the full size of the quint-block is 7 bits.
Then, bits are stored in the sequence in the following order:
First, the low bits for the first integer are stored.
Then, bits[2:0] of the quint-block are stored.
Then, the low bits for the second integer are stored.
Then, bits[4:3] of the quint-block are stored.
Then, the low bits for the third integer are stored.
Then, bit[6:5] of the quint-block is stored.

This operation is repeated for every group of 3 integers, until all the integers in the sequence have been consumed. At encode time, if the number of integers is not a multiple of 3, the integer sequence is padded with 0s until its size becomes a multiple of 3. At decode time, if the number of integers to extract from the sequence is not a multiple of 3, then the sequence's bit representation has a (notionally infinite) string of zero-bits appended. This way, the format only stores bits for the integers actually needed, instead of storing bits for a multiple-of-3 integers.

Decoding of a Quint-Block

Let the quint-block be denoted by b[6:0]. Now, proceed as follows:

- If b[2:1]= 2' b 1 1 and b[6:5]= 2' b 0 0 then
  - Set $t_2$= {b[0], b[4]&~ b[0], b[3]&~ b[0]}, $t_1$= 4 , $t_0$= 4
- Else
  - If b[2:1]= 2' b 1 1 then
    • Set $t_2$= 4 and c={b[4:3], ~ b[6:5], b[0]}
  - Else
    • Set $t_2$= { 1' b 0, b[6:5]} and c= b[4:0]
  - If c[2:0]= 3' b 1 0 1 then
    • Set $t_1$= 4 and $t_0$= { 1' b 0, c[4:3]}
  - Else
    • Set $t_1$= { 1' b 0, c[4:3]} and $t_0$= c[2:0]

This encoding is chosen by two criteria:
3. It has the property that if only the n lowest quints are nonzero, then only the $$\left\lceil \frac{7n}{3} \right\rceil$$

lowest bits of the quint-block can actually be nonzero.
4. The decoding process has a particularly efficient hardware implementation.

The AND-NOT operation in the first rule ensures that all 128 possible values decode to valid quint-triplets, even though there exists only $5^3$=125 distinct quint-triplet values; four of the values (of the form 7'b00xx111) represent the quint-triplet <4,4,4>.

The above decoding arrangement when using trits or quints effectively, for a stream of values, first emit the bits for each value, and then emit sufficient bits from the packed trit- or quint-block to make up 8n/5 (rounded up) bits or 7n/3 (rounded up) bits, respectively. This ensures that the bitstream can be terminated after any value without losing data.

The above trit/quint unpacking functions have a relatively low hardware cost.

Other arrangements would, of course, be possible. For example, there are a fairly large number of possible unpacking functions as such; some of these can be obtained by e.g. just inverting or swapping input or output bits relative to what is described above; other ones can be obtained by more elaborate sub-case approaches or by arithmetic (repeated division/modulo gives one particularly-easy-to-understand unpacking; however this approach is expensive in HW) or by look-up tables (which allow arbitrary unpacking functions albeit at a higher cost).

Color Endpoint Unquantization

The color endpoints, after having been extracted from their Integer Sequence Encoding, need to be unquantized so that they end up in the range 0 . . . 255 instead of whatever range was used in the Integer Sequence Encoding.

For bit-only ranges, the unquantization is done using simple bit replication.

In the case of a number composed of a trit/quint and one or more bits, a more elaborate procedure is performed:

First, the lowest bit $b_0$ is cut off.
Based on the range used, a constant C is selected; the trit or quint is multiplied by this constant, resulting in the 9-bit value T.
Based on the range used, a swizzle is performed on the remaining bits; this 9-bit value is called B.
The addition T+B is then performed, then every bit of the addition result is XORed with the bit $b_0$.
The result is a 9-bit number; $b_0$ is prepended to this number, then the two lowest bits are discarded; this leaves 8 bits, which is the unquantization result.

Below are tables that specify the swizzles and C values to use for the various ranges. Note that the lowest bit $b_0$ is not part of the input bits.

Swizzles and C values for the case where a trit component is present:

| Range   | Input bits | Swizzle    | C   |
|---------|------------|------------|-----|
| 0 . . . 5    | none       | 000000000  | 204 |
| 0 . . . 11   | a          | a000a0aa0  | 93  |
| 0 . . . 23   | ab         | ab000abab  | 44  |
| 0 . . . 47   | abc        | abc000abc  | 22  |
| 0 . . . 95   | abcd       | abcd000ab  | 11  |
| 0 . . . 191  | abcde      | abcde000a  | 5   |

Swizzles and C values for the case where a quint component is present:

| Range   | Input bits | Swizzle    | C   |
|---------|------------|------------|-----|
| 0 . . . 9    | none       | 000000000  | 113 |
| 0 . . . 19   | a          | a0000aa00  | 54  |
| 0 . . . 39   | ab         | ab0000aba  | 26  |
| 0 . . . 79   | abc        | abc0000ab  | 13  |
| 0 . . . 159  | abcd       | abcd0000a  | 6   |

This procedure produces an unquantization result with an error that is never greater than off-by-1 relative to a correctly-rounding unquantization, while imposing a much lesser hardware cost (the "correctly rounding" unquantization procedure requires a multiplier, while the procedure presented here does not). It can have the side effect of scrambling the code point order, but this does not adversely affect image quality and is therefore considered acceptable (the encoder can easily compensate for this scrambling with a simple table lookup).

In this unquantisation procedure, the constant C is based on 1023/M where M is the maximum value in the range, and is selected so that the trit or quint makes a low-order contribution to the final unquantized result (while the bits make a high-order contribution, which is what the swizzle ultimately tries to achieve), such that the representable codepoints are as evenly distributed as possible.

The swizzle patterns are related to the bit patterns of the reciprocal of M, so that the swizzle effectively does a truncated multiplication.

The manipulation using $b_0$ is done in order to obtain codepoint symmetry, so that if there exists a value that unquantizes to X, there also always exists a value that unquantizes to 255-X. (This symmetry does not quite hold for the 0 . . . 2 and 0 . . . 4 ranges, which do not allow for the $b_0$ bit at all; these have an odd number of codepoints and therefore cannot be made symmetric.)

Color Endpoint Modes

The format of the present embodiment supports a total of 16 Color Endpoint Modes; these modes control how the color endpoint integers are converted into actual endpoint colors. The integers are the 0.255 range integers that are present after the Color Endpoint Unquantization.

Several procedures are used repeatedly for several color conversion modes; below, C++ implementations of these procedures are given:

The bit_transfer_signed Procedure

The bit_transfer procedure is used when one of the integers in an endpoint representation is deemed to require more precision than the other ones. It is used instead of independently assigning ranges to some sets of values, to skew the bit distribution more favourably.

Assuming two integers A and B, the bit-transfer works from A to B as follows:

```
void bit_transfer_signed( uin8_t &a, uint8_t &b )
{
    b >>= 1;
    b |= a & 0x80;
    a >>= 1;
    a &= 0x3F;
    if( (a & 0x20) != 0 ) a -= 0x40;
}
```

Where necessary, the encoding should specify which values are the donors and which the receivers of the transferred bits.

The Blue-Contraction Procedure

The blue_contract procedure is used to provide 1 extra bit of effective precision for the red and green components of RGB colors that are close to gray. The procedure works as follows:

```
void blue_contract( uint8_t &r, uint8_t &g, uint8_t &b )
{
    r = (r+b) >> 1;
    g = (g+b) >> 1;
}
```

This procedure is used, because the Applicants have recognised that if the texels in a block to be encoded are close to grey, then the endpoint r, g, and b values will be close to one another, and it is advantageous in that case to encode the r and g components with more precision than the blue. The encoder may decide in this case to transfer precision from the blue by expanding the endpoint's green and red components according to the following blue-expansion transformation:

$$G=(g<<1)-b$$

$$R=(r<<1)-b$$

$$B=b$$

(It can be determined that the endpoints are sufficiently close to the gray line by, for example, testing if the gray expansion transform results in values that can be properly represented, i.e. they are still in the range 0 . . . 1. Other arrangements would, of course, be possible.)

The resulting R and G and B values are encoded as the endpoint values.

If this has been applied during encoding, the inverse "blue contraction" transformation described above must be applied to the endpoint values after decoding:

$$g=(G+B)>>1$$

$$r=(R+B)>>1$$

$$b=B$$

The encoder could use an additional bit to indicate to the decoder that this is required, but in the present embodiment it takes advantage of the fact that the order of endpoints is not important. A comparison function between the two endpoint colors (e.g. by comparing the total of r, g and b for each endpoint) is therefore defined. The encoder then orders the endpoints such that that the results of the comparison between the color values at endpoint 1 and endpoint 2 reflects whether blue contraction should be applied during the decoding process or not. The decoder will then use the same comparison function to conditionally apply blue contraction on the endpoint values after decoding (as discussed below).

Colour Endpoint Mode 0: Two Luminance or Alpha Endpoints

This mode takes as input two integers (v0, v1). If v0 is less than or equal to v1, then these integers form two RGBA colors (r0,g0,b0,a0)=(v0,v0,v0,0xFF) and (r1,g1,b1,a1)=(v1,v1,v1, 0xFF). Otherwise, they form two RGBA colors (r0,g0,b0, a0)= (0,0,0,v1) and (r1,g1,b1,a1)=(0,0,0,v0).

Mode 1: Luminance, Base+Offset

This mode takes as input two integers (v0,v1). Two integers l0 and l1 are then formed according to the following procedure:

```
void mode1_unpack( int v0, int v1, int &l0, int &l1 )
{
    l0 = (v0 >> 2) | (v1 & 0xC0);
    l1 = l0 + (v1 & 0x3f);
    if(l1 > 0xFF) l1 = 0xFF;
}
```

After this, two RGBA colors are formed as (r0,g0,b0,a0)= (l0,l0,l0,0xFF) and (r1,g1,b1,a1)=(l1,l1,l1,0xFF)

Mode 2: HDR Luminance, Large Range

This mode takes as input two integers (v0,v1). These two integers are then unpacked into a pair of HDR luminance values, as follows:

```
void mode2_unpack_y( int v0, int v1, int &y0, int &y1 )
    {
        if(v1 >= v0)
        {
            y0 = (v0 << 4);
            y1 = (v1 << 4);
        }
        else
        {
            y0 = (v1 << 4) + 8;
            y1 = (v0 << 4) – 8;
        }
    }
```

This mode is intended for use when there are large luminance changes in a small region or there is a need to represent very large/small luminance values.

Mode 3: HDR Luminance, Small Range

This mode takes as input two integers (v0,v1). These two integers are then unpacked into a pair of HDR luminance values, as follows:

```
void mode3_unpack_y( int v0, int v1, int &y0, int &y1 )
    {
        if((v0&0x80) !=0)
        {
            y0 = ((v1 & 0xE0) << 4) | ((v0 & 0x7F) << 2);
            d = (v1 & 0x1F) << 2;
        }
        else
        {
            y0 = ((v1 & 0xF0) << 4) | ((v0 & 0x7F) << 1);
            d = (v1 & 0x0F) << 1;
        }
        y1 = y0 + d;
        if(y1 > 0xFFF) { y1 = 0xFFF; }
    }
```

Mode 4: Two Luminance-Alpha Endpoints

This mode takes as input four integers (v0, v1, v2, v3). These integers form two RGBA colors (r0,g0,g0,a0)=(v0,v0,v0,v2) and (r1,g1,b1,a1)=(v1,v1,v1,v3)

Mode 5: Luminance-Alpha, Base+Offset

This mode takes as input four integers (v0, v1, v2, v3). From these integers, a base value (lb, ab)=(v0, v2) and an offset value (lo,ao)=(v1,v3) are formed; the bit_transfer_signed procedure is then performed to transfer one bit from lo to lb, and one bit from ao to ab; the two endpoints then form two RGBA colors as (r0,g0,b0,a0)=(lb,lb,lb,ab) and (r1,g1,b1,a1)=(lb+lo,lb+lo,lb+lo,ab+ao). The RGB values are clamped to the range 0x00 . . . 0xFF.

Mode 6: RGB and Scale

This mode takes as input four integers (v0, v1, v2, v3). From these integers, two endpoint colors are formed:
  Endpoint color 0 is given by (r0,g0,b0,a0)=((v0*v3)>>8, (v0*v3)>>8, (v2*v3)>>8, 0xFF)
  Endpoint color 1 is given by (r1,g1,b1,a1)=(v0,v1,v2, 0xFF)

Mode 7: Two HDR RGB Endpoints, Base and Scale

This mode takes as input four integers (v0, v1, v2, v3). These are a complex packing allowing bits to be transferred from one color component to another. The integers are unpacked into two HDR RGBA endpoint colors e0 and e1 as follows:

```
void mode7_unpack_y( int v0, int v1, color &e0, color &e1 )
{
    int modeval = ((v0 & 0xC0) >> 6) | ((v1 & 0x80) >> 5) | ((v2 & 0x80) >> 4);
    int majcomp;
    int mode;
    if( (modeval & 0xC ) != 0xC )
        { majcomp = modeval >> 2; mode = modeval & 3; }
    else if( modeval != 0xF )
        { majcomp = modeval & 3; mode = 4; }
    else
        { majcomp = 0; mode = 5; }
    int red = v0 & 0x3f;
    int green = v1 & 0x1f;
    int blue = v2 & 0x1f;
    int scale = v3 & 0x1f;
    int x0 = (v1 >> 6) & 1; int x1 = (v1 >> 5) & 1;
    int x2 = (v2 >> 6) & 1; int x3 = (v2 >> 5) & 1;
    int x4 = (v3 >> 7) & 1; int x5 = (v3 >> 6) & 1; int x6 = (v3 >> 5) & 1;
    int ohm = 1 << mode;
    if( ohm & 0x30 ) green |= x0 << 6;
    if( ohm & 0x3A ) green |= x1 << 5;
    if( ohm & 0x30 ) blue |= x2 << 6;
    if( ohm & 0x3A ) blue |= x3 << 5;
    if( ohm & 0x3D ) scale |= x6 << 5;
    if( ohm & 0x2D ) scale |= x5 << 6;
    if( ohm & 0x04 ) scale |= x4 << 7;
    if( ohm & 0x3B ) red |= x4 << 6;
    if( ohm & 0x04 ) red |= x3 << 6;
    if( ohm & 0x10 ) red |= x5 << 7;
    if( ohm & 0x0F ) red |= x2 << 7;
    if( ohm & 0x05 ) red |= x1 << 8;
    if( ohm & 0x0A ) red |= x0 << 8;
    if( ohm & 0x05 ) red |= x0 << 9;
    if( ohm & 0x02 ) red |= x6 << 9;
    if( ohm & 0x01 ) red |= x3 << 10;
    if( ohm & 0x02 ) red |= x5 << 10;
    static const int shamts[6] = { 1,1,2,3,4,5 };
    int shamt = shamts[mode];
    red <<= shamt; green <<= shamt; blue <<= shamt; scale <<= shamt;
    if( mode != 5 ) { green = red – green; blue = red – blue; }
    if( majcomp == 1 ) swap( red, green );
    if( majcomp == 2 ) swap( red, blue );
    e1.r = clamp( red, 0, 0xFFF );
    e1.g = clamp( green, 0, 0xFFF );
    e1.b = clamp( blue, 0, 0xFFF );
    e1.alpha = 0x780;
    e0.r = clamp( red – scale, 0, 0xFFF );
    e0.g = clamp( green – scale, 0, 0xFFF );
    e0.b = clamp( blue – scale, 0, 0xFFF );
    e0.alpha = 0x780;
}
```

Mode 8: Two RGB Endpoints

This mode takes as input six integers (v0, v1, v2, v3, v4, v5). From these integers, two sums: s0=(v0+v2+v4), s1=(v1+v3+v5) are computed. These two sums are then compared:

If s1>=s0, then the two endpoint colors are obtained as (r0,g0,b0,a0)=(v0,v2,v4,0xFF) and (r1,g1,b1,a1)=(v1, v3,v5,0xFF)

If s1<s0, then the two endpoint colors are obtained as (r0,g0,b0,a0)=(v1,v3,v5,0xFF) and (r1,g1,b1,a1)=(v0, v2,v4,0xFF); both of these two endpoint colors are then subjected to the blue_contraction procedure.

Mode 9: RGB Base+Offset

This mode takes as input six integers (v0, v2, v2, v3, v4, v5). These integers form an RGB base (rb, gb, bb)=(v0, v2, v4) and an RGB offset (ro, go, bo)=(v1,v3,v5). The base and offset values are then modified by having the bit_transfer_signed procedure applied to them to move one bit from the offset to the base (that is, from ro to rb, from go to gb and from bo to bb).

The two endpoint colors are then given by (rb,gb,bb,0xFF) and (rb+ro, gb+go, bb+bo, 0xFF).

If the offset sum s=(ro+go+bo) is negative, then the two endpoint numbers are swapped and have the blue_contraction procedure applied to them). The RGB values are clamped to the range 0x00 . . . 0xFF.

Mode 10: RGB, Scale, and Two Alpha Endpoints

This mode takes as input six integers (v0, v1, v2, v3, v4, v5). First, use (v0,v1,v2,v3) to produce two endpoint colors just as in Mode 6. Then replace the alpha of the first endpoint color with v4 and the alpha of the second endpoint color with v5.

Mode 11: Two HDR RGB Endpoints

This mode takes as input six integers (v0, v1, v2, v3, v4, v5). These are a complex packing allowing bits to be transferred from one color component to another. The integers are unpacked into two HDR RGBA endpoint colors e0 and e1 as follows:

```
void mode11_unpack_rgb( int v0, int v1, int v2, int v3, int v4, int v5,
color &e0, color &e1)
    {
        int majcomp = ((v4 & 0x80) >> 7) | ((v5 & 0x80) >> 6);
        if( majcomp == 3 )
        {
            e0 = (v0 << 4, v2 << 4, (v4 & 0x7f) << 5, 0x780);
            e1 = (v1 << 4, v3 << 4, (v5 & 0x7f) << 5, 0x780);
            return;
        }
        int mode = ((v1 & 0x80) >> 7) | ((v2 & 0x80) >> 6) |
                   ((v3 & 0x80) >> 5);
        int va = v0 | ((v1 & 0x40) << 2);
        int vb0 = v2 & 0x3f;
        int vb1 = v3 & 0x3f;
        int vc = v1 & 0x3f;
        int vd0 = v4 & 0x7f;
        int vd1 = v5 & 0x7f;
        static const int dbitstab[8] = {7,6,7,6,5,6,5,6};
        vd0 = signextend( vd0, dbitstab[mode] );
        vd1 = signextend( vd1, dbitstab[mode] );
        int x0 = (v2 >> 6) & 1;
        int x1 = (v3 >> 6) & 1;
        int x2 = (v4 >> 6) & 1;
        int x3 = (v5 >> 6) & 1;
        int x4 = (v4 >> 5) & 1;
        int x5 = (v5 >> 5) & 1;
        int ohm = 1 << mode;
        if( ohm & 0xA4 ) va |= x0 << 9;
        if( ohm & 0x08 ) va |= x2 << 9;
        if( ohm & 0x50 ) va |= x4 << 9;
        if( ohm & 0x50 ) va |= x5 << 10;
        if( ohm & 0xA0 ) va |= x1 << 10;
        if( ohm & 0xC0 ) va |= x2 << 11;
        if( ohm & 0x04 ) vc |= x1 << 6;
        if( ohm & 0xE8 ) vc |= x3 << 6;
        if( ohm & 0x20 ) vc |= x2 << 7;
        if( ohm & 0x5B ) vb0 |= x0 << 6;
        if( ohm & 0x5B ) vb1 |= x1 << 6;
        if( ohm & 0x12 ) vb0 |= x2 << 7;
        if( ohm & 0x12 ) vb1 |= x3 << 7;
        int shamt = (modeval >> 1 ) ^ 3;
        va <<= shamt; vb0 <<= shamt; vb1 <<= shamt;
        vc <<= shamt; vd0 <<= shamt; vd1 <<= shamt;
        e1.r = clamp( va, 0, 0xFFF );
        e1.g = clamp( va - vb0, 0, 0xFFF );
        e1.b = clamp( va - vb1, 0, 0xFFF );
        e1.alpha = 0x780;
        e0.r = clamp( va - vc, 0, 0xFFF );
        e0.g = clamp( va - vb0 - vc - vd0, 0, 0xFFF );
        e0.b = clamp( va - vb1 - vc - vd1, 0, 0xFFF );
        e0.alpha = 0x780;
        if( majcomp == 1 ) { swap( e0.r, e0.g ); swap( e1.r, e1.g ); }
        else if( majcomp == 2 ) { swap( e0.r, e0.b ); swap( e1.r, e1.b
        ); }
    }
```

Unlike mode 7, this mode is able to represent the full HDR range.

Mode 12: Two RGBA Endpoints

This mode takes as input eight integers (v0, v1, v2, v3, v4, v5, v6, v7). From these integers, two sums: s0=(v0+v2+v4), s1=(v1+v3+v5) are computed. These two sums are then compared:

If s1>=s0, then the two endpoint colors are obtained as (r0,g0,b0,a0)=(v0,v2,v4,v6) and (r1,g1,b1,a1)=(v1,v3, v5,v7)

If s1<s0, then the two endpoint colors are obtained as (r0,g0,b0,a0)=(v1,v3,v5,v7) and (r1,g1,b1,a1)=(v0,v2, v4,v6); both of these two endpoint colors are then subjected to the blue_contraction procedure.

Mode 13: RGBA Base+Offset

This mode takes as input eight integers (v0, v1, v2, v3, v4, v5, v6, v7). These integers form an RGBA base (rb, gb, bb, ab)=(v0,v2,v4,v6) and an RGB offset (ro, go, bo, ao)=(v1,v3, v5,v7). The bit_transfer_signed procedure is then used to transfer a bit from the offset value to the base values. The two endpoint colors are then given by (rb,gb,bb,ab) and (rb+ro, gb+go, bb+bo, ab+ao). If (ro+go+bo) is negative, then the blue_contraction procedure is applied to the RGB portion of each endpoint.

Mode 14: Two HDR RGBA Endpoints with LDR Alpha

This mode takes as input eight integers (v0, v1, v2, v3, v4, v5, v6, v7). The RGB components are decoded from values (v0 . . . v5) in the manner of Mode 11 discussed above. The alpha components for endpoints 0 and 1 are then filled in from values v6 and v7 respectively.

Mode 15: Two HDR RGBA Endpoints with HDR Alpha

This mode takes as input eight integers (v0, v1, v2, v3, v4, v5, v6, v7). The RGB components are decoded from values (v0 . . . v5) in the manner of Mode 11 discussed above. The alpha components are then decoded as follows from values v6 and v7 as follows:

```
void mode15_ unpack_alpha(int v6, int v6, int& alpha0, int& alpha1)
    {
        mode = ((v6 >> 7) & 1 ) | ((v7 >> 6) & 2);
        v6 &= 0x7F;
        v7 &= 0x7F;
        if(mode==3)
        {
            alpha0 = v6 << 5;
            alpha1 = v7 << 5;
        }
        else
        {
            v6 |= (v7 << (mode+1))) & 0x780;
            v7 &= (0x3F >> mode);
            v7 ^= 0x20 >> mode;
            v7 -= 0x20 >> mode;
            v6 <<= (4-mode);
            v7 <<= (4-mode);
            v7 += v6;
            v7 = clamp(v7, 0, 0xFFF);
            alpha0 = v6;
            alpha1 = v7;
        }
    }
```

The Void-Extent Block

A Void-Extent block is an encoded texture data block that specifies a region within the texture in which every texture data element should be allocated the same data value when decoded and in which every sample look-up within the encoded texture will only use texture data elements having that same data value (in the present embodiment). If bits[8:0] of the compressed (encoded) block are "111111100", then the compressed block is a Void-Extent Block. This means that the block has a constant color that is common for all texels in the block, and the block additionally specifies a region within the texture (for a 2D block) in which every bilinear-sampled lookup within the texture will only touch texels whose color is identical to this constant color.

The Void-Extent feature is intended to enable specific texturing optimizations:

If a texture mapper uses a multipass method for trilinear filtering or anisotropic mapping, it may use the information in the Void-Extent block to ascertain that all its passes will only ever access texels of the same value, and thus return that value as the final texturing result immediately after the first pass without running any further passes.

A texture mapper may additionally keep a cache of recently-seen Void-Extent blocks and use them to suppress actual texture-cache line fills from memory for subsequent texturing operations.

Using the Void-Extent information is not mandatory; a texture mapper that does not implement these optimizations may ignore the Void-Extent and just treat the block as a constant-color block.

The following rules and observations apply:

If the Void-Extent coordinates are all 1s, then it is interpreted as if the block has no Void-Extent at all and is simply a constant-color block.

Encoders that cannot compute Void-Extents properly but still wish to use constant-color blocks thus always have the option to just specify an all-1s pattern for the Void-Extent in order to produce a straight constant-color block.

If a Void-Extent appears in a mipmap other than the most detailed (lowest) one, then the Void-Extent applies to all more detailed (lower) mipmap levels as well. As such, a texture mapper that implements mipmapping as a multipass method may sample the least detailed (highest) mipmap first, then upon encountering a Void-Extent, it may abstain from sampling the more detailed (lower) mipmap.

A consequence of this rule is that if a block has a constant color but the corresponding region in any of the more detailed (lower) mipmaps do not have a constant color, then the Void-Extent coordinates must be set to all 0s to signal the absence of a Void-Extent block. This situation is always the case for the top 1×1 level of any mipmap pyramid, and may be the case for more detailed (lower) levels as well, in case of e.g. checkerboard textures.

The constant-color itself is specified using IEEE-754-2008 compliant FP16 values; this is the way in the format of the present embodiment to specify floating-point content that can hold negative values.

If a Void-Extent extends all the way to the edge of a texture, the filtered texturing result may not necessarily be equal to the texel value specified in the Void-Extent block; this may happen if data sources other than the texture surface itself contributes to the final filtered result. In such cases, the texture mapper must include such data into its filtering process in the same manner as if the Void-Extent were not present. Examples of such data sources are:

Texture border color, when the border color is different from the color specified in the Void-Extent block.

Adjacent-face textures in case of Seamless Cube-Mapping

Neighboring texture repeat in the case of the "Repeat" texture wrap mode

If the texture mapper is keeping a cache of recently-seen Void-Extent blocks, it must guarantee that the presence of this cache does not produce texture filtering results that are different from the result it would have produced without the cache; depending on the specifics of the filtering unit, this may limit caching to Void-Extent blocks with very specific color values (e.g. all components are 0 or 1).

The Void-Extent specified by a Void-Extent block does not need to actually overlap the block itself; such non-overlap is unlikely to be useful, though.

Invalid Void-Extents—that is, a Void-Extent specified across a region of a texture that does not actually have a constant color—will result in undefined texturing results.

2D Textures

For 2D textures, the Void-Extent Block has the following layout:

| Bits | Usage |
| --- | --- |
| 8:0 | "111111100" |
| 9 | Dynamic range flag |
| 11:10 | Reserved, set to "11". |
| 24:12 | Void Extent: Low S coordinate |
| 37:25 | Void Extent: High S coordinate |
| 50:38 | Void Extent: Low T coordinate |
| 63:51 | Void Extent: High T coordinate |
| 79:64 | Block color R component |
| 95:80 | Block color G component |
| 111:96 | Block color B component |
| 127:112 | Block color A component |

The Void Extent is defined by a (low,high) interval for the S and T texture coordinates. The interval endpoints are represented as UNORM13 values; as such, to get normalized coordinates in the [0,1] range, the values stored in the block must be divided by $2^{13}-1$.

The Dynamic Range flag indicates the format in which the block color is stored. A 0 indicates LDR colors, in which case the color components are stored as normalized 16-bit integer values. A 1 indicates HDR color, in which case the color components are stored as FP16 values.

3D Textures

For 3D textures, the Void-Extent Block has the following layout:

| Bits | Usage |
| --- | --- |
| 8:0 | "111111100" |
| 9 | Dynamic range flag |
| 18:10 | Void Extent: Low S coordinate |
| 27:19 | Void Extent: High S coordinate |
| 36:28 | Void Extent: Low T coordinate |
| 45:37 | Void Extent: High T coordinate |
| 54:46 | Void Extent: Low P coordinate |
| 63:55 | Void Extent: High P coordinate |
| 79:64 | Block color R component |
| 95:80 | Block color G component |
| 111:96 | Block color B component |
| 127:112 | Block color A component |

The Void-Extent is defined by a (low,high) interval for the S, T and P texture coordinates. The interval endpoints are represented as UNORM9 values; as such, to get normalized coordinates in the [0,1] range, the values stored in the block must be divided by $2^9-1$.

The Dynamic Range flag indicates the format in which the block color is stored. A 0 indicates LDR colors, in which case the color components are stored as normalized 16-bit integer values. A 1 indicates HDR color, in which case the color components are stored as FP16 values.

Partitioning Pattern Generator

As discussed above, the encoding scheme of the present embodiment uses a partitioning pattern generator (a partitioning pattern generation function) in order to produce its partitioning patterns; this allows a large number of partitioning patterns to be supported at minimal hardware cost. (This comes at a slight quality cost compared to using optimized partition tables, however this cost has been measured to be only about 0.2 dB, which does not justify the large hardware cost of providing a full set of optimized tables.)

The generator itself is specified in the form of a C99 function. The arguments to this function are:

- a seed: this is the partition index specified at bits 17:8 in the 128-bit compressed block. This seed may take values from 0 to 1023.
- a partition count; this may be 2, 3 or 4.
- x, y and z positions; these are x, y and z texel position relative to the upper-left corner of the compressed block (for a 2D block, z is set to zero (0)).
- a flag indicating small blocks; its value depends on the block size being used. The value of this flag is chosen to be 1 if the number of texels in the block is less than 31, otherwise it is set to 0.

The function returns an integer value in the range 0.3 specifying which partition the specified texel belongs to. The actual function is defined as follows:

```
int select_partition( int seed, int x, int y, int z, int partitioncount, int small_block )
{
    // first, scale up coordinates for small blocks.
    if(small_block) { x <<= 1; y <<= 1; z <<= 1; }
    // then, compute eight pseudoranom numbers, all of uniform distribution.
    // They need to be at least approximately statistically independent,
    // so that they can cover a reasonably wide parameter space.
    // the random-seed is modified with the partition-count, so that the
    // partitionings we generate for 2, 3 and 4 partitions are distinct.
    seed += (partitioncount−1) * 1024;
    // we need reproducibility of the pseudorandom numbers, which calls for
    // a hash function. The hash52( ) function is designed specifically to provide
    // a strong pseudorandom distribution at a modest hardware cost.
    uint32_t rnum = hash52(seed);
    // construct the seed values from the hash value. While it is important that
    // the seeds are independent, it is not important that they have great precision;
    // in fact, no error improvement was seen when using seeds wider than 4 bits.
    int seed1 = rnum & 0xF;
    int seed2 = (rnum >> 4) & 0xF;
    int seed3 = (rnum >> 8) & 0xF;
    int seed4 = (rnum >> 12) & 0xF;
    int seed5 = (rnum >> 16) & 0xF;
    int seed6 = (rnum >> 20) & 0xF;
    int seed7 = (rnum >> 24) & 0xF;
    int seed8 = (rnum >> 28) & 0xF;
    int seed9 = (rnum >> 18) & 0xF;
    int seed10 = (rnum >> 22) & 0xF;
    int seed11 = (rnum >> 26) & 0xF;
    int seed12 = ((rnum >> 30) | (rnum << 2)) & 0xF;
    // square the seeds. This biases them, so that they are more likely to
    // take small rather than large values. The seed values represent
    // frequencies for a 2D sawtooth function; squaring them causes
    // low frequencies to be more heavily represented than high freqeuncies.
    // For the partition function, this causes partitionings with low frequencies
    // (large, cleanly-divided regions) to appear more frequently than
    // partitionings with high frequencies (lots of detail), while not entirely
    // blocking the latter.
    seed1 *= seed1;
    seed2 *= seed2;
    seed3 *= seed3;
    seed4 *= seed4;
    seed5 *= seed3;
    seed6 *= seed6;
    seed7 *= seed7;
    seed8 *= seed8;
    seed9 *= seed9;
    seed10 *= seed10;
    seed11 *= seed11;
    seed12 *= seed12;
    // perform shifting of the seed values
    // this causes the sawtooth functions to get increased high-frequency content along
                either
    // the X axis or the Y axis or neither; the result is an increase in the amount of
    // partitionings that are dominated by horizontal/vertical stripes; these are
    // relatively important for overall psnr.
    int sh1, sh2, sh3;
    // use the bottom bit of the seed to toggle horiz/vert direction.
    if( seed & 1 )
    {
        sh1 = (seed & 2 ? 4 : 5);
        sh2 = (partitioncount == 3 ? 6 : 5);
    }
    else
```

```
        {
            sh1 = (partitioncount == 3 ? 6 : 5);
            sh2 = (seed & 2 ? 4 : 5);
        }
        sh3 = (seed & 0x10) ? sh1 : sh2;
    seed1 >>= sh1;
    seed2 >>= sh2;
    seed3 >>= sh1;
    seed4 >>= sh2;
    seed5 >>= sh1;
    seed6 >>= sh2;
    seed7 >>= sh1;
    seed8 >>= sh2;
    seed9 >>= sh3;
    seed10 >>=sh3;
    seed11 >>=sh3;
    seed12 >>=sh3;
    // combine the seed values with the XYZ coordinates to produce 3D planar functions
    // Each of them also has an offset added; this offset itself needs to be pseudorandom
    // and unbiased for optimal quality. Unlike the seeds themselves, this offset
    // needs to have a uniform distribution.
    int a = seed1*x + seed2*y + seed11*z + (rnum >> 14);
    int b = seed3*x + seed4*y + seed12*z + (rnum >> 10);
    int c = seed5*x + seed6*y + seed9*z + (rnum >> 6);
    int d = seed7*x + seed8*y + seed10*z + (rnum >> 2);
    // bitwise "AND" with a mask turns planar functions into sawtooth functions.
    a &= 0x3F;
    b &= 0x3F;
    c &= 0x3F;
    d &= 0x3F;
    // remove some of the functions if we are using less than 4 partitions.
    if( partitioncount < 4 ) d = 0;
    if( partitioncount < 3 ) c = 0;
    // then, compare the resulting sawtooth-function values in order to select
    // a partition.
    if( a >= b && a >= c && a >= d )
        return 0;
    else if( b >= c && b >= d )
        return 1;
    else if( c >= d )
        return 2;
    else
        return 3;
}
```

The generator relies on an auxiliary function called hash52( ); this function itself is defined as follows:

Note that the arithmetic in hash52( ) must be implemented using unsigned integers that are exactly 32 bits wide. Also

```
    // autogenerated hash function. This hash function was produced by generating
    // random instruction sequences (from the set: add-shift, xor-shift, multiply-by-odd-constant;
    // these operations have in common that they are all invertible and therefore cannot lose data)
    // and then checking whether the instruction sequence, when fed the input data sequence
    // 0,1,2,3, ... produces a good pseudorandom output data sequence. The randomness tests run
    // were George Marsaglia's "Some Difficult-to-pass Tests Of Randomness".
    // Several hundred sunch instruction sequences were generated; "hash52" below was the
    // one that appeared to have the most compact hardware representation.
    // the multiply-by-odd-constant steps had their constants specifically selected so that they
    // could be implemented with three shift-add operations, which are much cheaper in hardware
    // than general multiplications.
    uint32_t hash52( uint32_t p )
    {
        p ^= p >> 15;
        p *= 0xEEDE0891; // (2^4+1)*(2^7+1)*(2^17-1)
        p ^= p >> 5;
        p += p << 16;
        p ^= p >> 7;
        p ^= p >> 3;
        p ^= p << 6;
        p ^= p >> 17;
        return p;
    }
``` note that the multiply may be implemented as a series of three addition/subtraction operations.

The above partition generation function basically works by implementing 2 to 4 sawtooth functions with pseudorandomly-selected directions and frequencies; this is particularly cheap to implement in hardware while being able to produce nearly all partition shapes of interest.

The seed (partition index) is used to generate the parameters for the sawtooth wave generation. As each different seed gives a different combination of waves, it can be thought of as a "pattern index". (The seed is accordingly, effectively equivalent to the index into the pattern table in a lookup-table based design.)

A mask is used to generate the sawtooth function. It effectively changes a continuously increasing set of values (e.g. 0, 16, 32, 48, 64, 80, 96, 112, 128, 144, 160 . . . ) into a repeating set. A mask of 0x3F applied to the previous sequence would give a sawtooth of (0, 16, 32, 48, 0, 16, 32, 48, 0, 16, 32, 48, 0, 16, 32 . . . ). This is equivalent to the remainder when dividing by 64, but only works when the divisor is a power of two. It is also very much cheaper to implement in hardware than a division circuit.

Other arrangements for determining the partitioning patterns could be used, if desired. For example, the function could be configured to generate curved partitioning shapes. For example, $x^2$ and $y^2$ terms could be added into the sawtooth functions. This will yield partitionings with curved shapes (which the "basic" version of the sawtooth function is unable to provide). However, testing with actual content did not actually show any image quality improvement from these shapes. This kind of curve support will also increase the hardware cost.

The partitioning pattern generation function is in an embodiment implemented as a dedicated hardware element in the decoder.

It would also be possible to use a ROM-based partition table, where the table is, e.g., generated through an optimization process against large amounts of game content. However, storing actual tables would consume large numbers of gates, which would also get multiplied by the number of different block sizes supported and could thereby hamper the scalability of the format.

Figure 16:
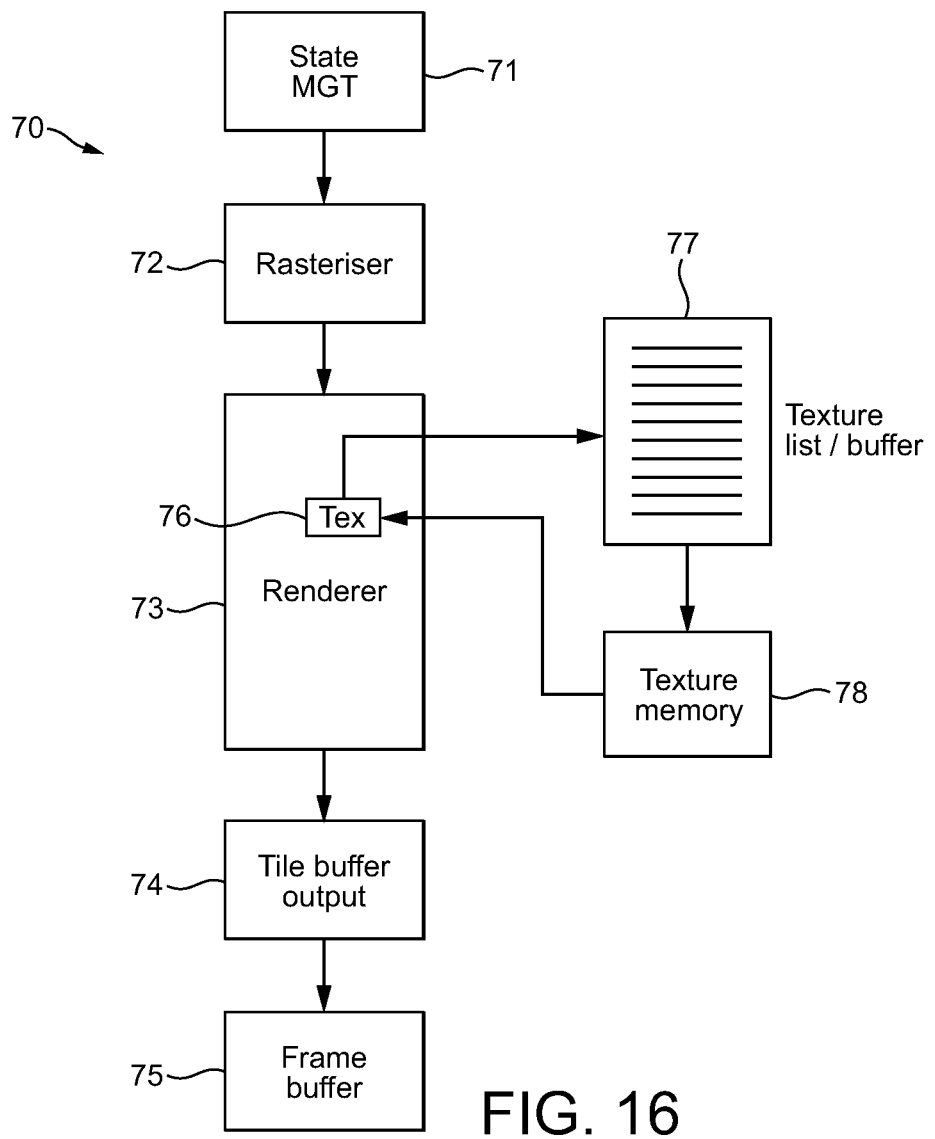
FIG. 16 shows schematically a graphics processing system that can use texture data that has been encoded in the manner of the technology described herein.

FIG. 16 shows schematically an arrangement of a graphics processing system 70 that can use textures that have been encoded in accordance with the present embodiment. In this embodiment, the graphics processing system 70 is a tile-based rendering system. However, other arrangements are, of course, possible.

As shown in FIG. 16, the graphics processing system 70 includes a state management system 71, a rasterising stage 72, and a rendering stage 73 in the form of a rendering pipeline. It will be appreciated that each of the stages, elements, and units, etc., of the graphics processor 70 as shown in FIG. 16 may be implemented as desired and will accordingly comprise, e.g., appropriate circuitry, and/or processing logic, etc., for performing the necessary operation and functions.

The state management system 71 stores and controls state data and the state of the graphics processing units to control the graphics processing operation, as is known in the art.

The rasteriser 72 takes as its input primitives to be displayed, and rasterises those primitives to sampling positions and generates fragments to be rendered, as is known in the art.

The rendering pipeline 73 takes fragments from the rasteriser 72 and renders those fragments for display. As is known in the art, the rendering pipeline 73 will include a number of different processing units, such as fragment shaders, blenders, texture mappers, etc.

The output from the rendering pipeline 73 (the rendered fragments) is output to tile buffers 74 (since the present embodiment is a tile-based system). The tile buffers' outputs are then finally output to a frame buffer 75 for display.

FIG. 16 also shows schematically particular features of the graphics processing system 70 that are provided in order for it to use textures encoded in the manner of the present embodiment.

In particular, as shown in FIG. 16, the rendering pipeline 73 includes a texture mapping stage 76 configured to be able to access a texture list buffer 77 to determine a texture needed for texturing a fragment that it receives for rendering.

The texture list buffer 77 will indicate the texture that is required, and then, as is known in the art, the texture mapper 76 will fetch the relevant texture data from a memory 78 and used the fetched texture data to process the fragment in question.

The textures stored in the texture memory 78 are stored using the encoding format of the present embodiment. Thus, when the texture mapper 76 needs a given texel or texels for applying to a fragment being rendered, it will determine the texture map and encoded block within that map that it needs for the texel in question (e.g. based on the position of the texel, as is known in the art), retrieve that block from the memory 78 and then determine the texel's value (e.g. colours) from the encoded block in the manner described above.

The texture mapper 76 includes a suitable decoder (decoding circuitry) to do this. This decoder may, e.g., be in the form of a dedicated hardware element that is configured to decode textures encoded in the form of the present embodiment, or it may, e.g., comprise programmable processing circuitry that has been programmed appropriately to be able to decode textures encoded in the form of the present embodiment. In an embodiment a dedicated hardware decoder is used. This decoder will, inter alia, implement the partitioning pattern generation function of the present embodiment.

In the present embodiment, the decoding process comprises first determining whether the position of a texture data element to be decoded is within a previously encountered and stored constant data value region (void extent). If it is, the stored corresponding constant data value for the constant data value region (void extent) in question is then returned as the data value to use for the texture data element immediately (i.e. without accessing and decoding any encoded texture data block).

On the other hand, if the position of a texture data element to be decoded is not within a previously encountered and stored constant data value region (void extent), then it is determined which encoded texture data block in the set of encoded texture data blocks representing the texture map to be decoded represents (contains) the texel whose value is required (i.e. that is to be decoded). This is done based on the position of the texel and knowledge of the block size and size of the texture. The identified encoded texture data block is then accessed (e.g. fetched) from memory.

It is then determined whether the encoded block is a Void Extent block (i.e. indicates a constant data value region) or not, by determining whether the block contains the void extent flag (and also that the block is not simply a "constant colour" block).

If the block is a Void Extent block, the decoder determines the constant data value indicated in the Void Extent block and uses that value as the data value for the texel in question.

The decoder also determines from the encoded Void Extent block the extent of the constant data value region specified by the block, and stores that information together with the constant data value for the region (void extent) in question for future use. This information is stored for the most recent Void Extent blocks that the decoder has accessed, on a first-in, first out basis. Other arrangements would, of course, be possible.

The decoding process in an embodiment also comprises, where the encoded texture data block to be decoded is indicated (flagged) as being a Void Extent block, then determining from the information in the block indicating the extent of the constant data value region whether the block is a true "Void Extent" block, or whether it is in fact only a "constant colour" block. In the latter case, it is in an embodiment also determined whether the constant data value applies to more detailed mipmaps or not. If the block is a "constant colour" block, the decoder determines the constant data value indicated in the block and uses that value as the data value for the texel in question.

Where the encoded texture data block is not a Void Extent or a "constant colour" block (i.e. is a "normal" block), the decoder determines the value for the texel from the encoded block of texture data as follows:

1. Find the x,y,z position of the texel to be decoded, relative to the corner of the block (for 2D blocks, z=0).
2. If there is more than one partition, pass the x,y,z position and the seed (partition index) through the partition generation function to determine the partition number for the texel.
3. Read and decode the endpoint values for the partition selected in step 2. This process depends on the colour endpoint mode.
4. Read and decode the index for the texel. Where to find the index data, and how to decode it, is determined by the index range, index count, and number of index planes.
5. Interpolate between the endpoint colors using the index value, as specified above.
6. If there are two index planes, repeat steps 4-5 for the second index, and combine the color components from the separate planes (e.g. RGB from one, A from another into a single RGBA value).
7. The final color is the decoded texel color.

Thus, in the present embodiment, the decoding process for a given texel whose value is required will comprise the following steps:

Determine the position of the texel being looked up
If it is inside a cached void-extent
    return the constant colour value for that extent immediately
else
    calculate which block the texel is in
    load the block
    if the block is a constant-colour block
        return the constant colour value
        if it's a void extent block
            cache the void extend bounds and the colour
        if it's not a constant-colour block
            decode as normal This is repeated for each texel value that is required, and the so-generated, decoded texel values are then applied to sampling positions (fragments) that are being rendered to generate rendered data for those sampling positions (fragments), which rendered data is then, e.g., written to the frame buffer for a display to display the "textured" sampling positions and/or fragments.

As discussed above, the decoder (the texture mapping process) is also configured, in response to recognition of a "constant data value" region indicating Void Extent block to: not perform (avoid) subsequent passes in a multi-pass texture mapping process once such a block has been identified; not sample (avoid sampling) more detailed mipmaps in a multi-pass mip-mapping process once such a constant data value region indicating block has been identified; cache recently loaded/processed constant data value region indicating (Void Extent) blocks and use them to suppress (texture) cache filling from memory for subsequent decoding (texturing) operations; and/or not load (avoid loading) adjacent encoded texture data blocks, where a constant data value region indicating (Void Extent) block has been recognised.

As will be appreciated from the above, in the decoding arrangements, the actual data values (e.g. in terms of their format and what they represent) that are generated for the set of data values to be used for a texture data block and for the individual texture data elements will depend on the nature of the texture data that is being encoded. Thus, for example, as discussed above, in the case of colour data and colour maps, each data value will represent a given colour, and, e.g., comprise a set of colour values, such as RGB or RGBa values. On the other hand, for a luminance map, each data value may comprise and represent a single luminance value. For normalmaps (bump maps), each data value will comprise a set of components representing a normal vector, and for shadow maps (light maps), each data value will comprise and represent a set of values indicating, e.g., the presence or absence, and amount of, light or shadow, and so on.

The above primarily describes the decoding process used in the embodiment of the technology described herein. As will be appreciated by those skilled in the art, the encoding process will be carried out in a corresponding converse manner.

Thus, to encode a given texture map using the above encoding format in the present embodiment, the original texture map is first divided into blocks of a selected size.

Each block of texture data elements is then tested to see whether the set of texture data elements of the block can be encoded as having the same, constant data value. This is done by determining whether all the texture data elements of the block have sufficiently similar data values to be encoded as a constant data value block (based, e.g., and in an embodiment, on some selected, in an embodiment predetermined, similarity margin or threshold)

Where it is determined that the texture data elements of a block of texture data elements to be encoded all have sufficiently similar data values, then the extent of a contiguous extended region within the texture including the block in which every texture data element has sufficiently similar data values is determined. This is done by attempting to extend a rectangular (for 2D) or rectangular cuboid (for 3D) region outwards from the edge of the block of texture data elements in question (while still only including texture data elements having sufficiently similar data (e.g. colour) values). Any suitable process, e.g. algorithm, can be used for this.

It should be noted here that the constant data value region does not need to align with the boundaries of the blocks the original texture has been divided into for encoding purposes, but can only partially cover or overlap blocks that the original texture has been divided into.

If an extended "constant data value" region is found, then the block of texture data elements in question is encoded as a Void Extent block, having the form discussed above.

The constant data value for an encoded Void Extent block may be selected as desired, based on the value of the texture data elements in the original texture in the region of the texture in question. For example, an average of the values of the texture data elements of the block (or void extent region)

could be used as the constant data value for the encoded Void Extent texture data block. Other arrangements would, of course, be possible.

It should be noted here that where a given block of texture data elements is found to fall within a constant data value region in the texture (and is encoded as such), that does not mean that other, e.g. adjacent, blocks of texture data elements that also fall within the same constant data value region do not need to be encoded. Rather, every separate block of texture data elements that falls within the same constant data value region (void extent) is still encoded as a respective separate encoded Void Extent texture data block specifying that region. This facilitates random access into the encoded texture.

The encoding process may also comprise identifying blocks of texture data elements as being constant data value blocks but which do not also specify a greater constant data value region (as discussed above), if desired. These blocks of texture data elements should then be encoded as "constant colour" blocks having the form discussed above.

Where it is determined that the set of texture data elements of a block of texture data elements don't all have sufficiently similar data values, then a "non-void extent" encoded texture data block representing the block of texture data elements having the form discussed above is generated.

The encoding process for a "non-constant data value" block can be carried out in any suitable manner on or using the original texture data that is to be encoded. For example, as in known prior art processes, the original data for the block could be encoded using some or all of the various different encoding and partitioning possibilities that are available (i.e. that, in effect, a "non-constant data value" encoded texture data block can represent). This will provide a set of possible encoded blocks that can then be compared with the original data, so as to determine, e.g., which encoded version of the block gives the least error (on reproduction) when compared to the original data (which encoding arrangement can then be selected as the one to use for that original texture data block when it is encoded).

This is done for each different block that the original data (e.g. texture map) has been divided into. The process may then be repeated using a different block size, and so on, if desired, until the block size and encoding arrangements giving the least error (or at least a sufficiently small error) is found, which may then be selected as the encoding arrangement to use for the texture.

The original texture may then be encoded using the determined block size and the encoding arrangement determined for each block (or the already encoded blocks from the testing used, if they have been retained), to produce a stream or set of encoded texture data blocks representing, and corresponding to, the original set of data (e.g. texture map). This set of encoded texture data blocks can then be stored, e.g. on a portable storage device such as a DVD, for later use, e.g. when it is desired to apply the texture to an image to be rendered.

In an embodiment a set of mipmaps is generated to represent the texture, with each mipmap in an embodiment being generated in the above manner. Where mipmaps are used, the compression rate (and bit rate) is in an embodiment varied for (is different for) different mipmap levels, with higher bit rates (i.e. lower levels of data compression) being used for smaller mipmap levels (i.e. lower resolution mipmap levels).

Each block that the original data (e.g. texture map) is divided into is in an embodiment the same size and configuration. The block size that is being used is provided to the decoder. This may be done, for example, by including (indicating) the block size in a (global) data header that is associated with (attached to) the set of encoded texture data blocks, or in any other suitable manner.

The selection algorithm can use any desired (and many different) testing schemes such as, for example, measuring the peak signal-to-noise ratio between the encoded version of a block and the original version of the block.

The encoding can be carried out as desired, e.g. using a suitably programmed general-purpose processor that, e.g., has access to the original texture data in memory, or a suitable dedicated processor could be used.

Although the above embodiment has been described with reference to texture data in the form of colours, as discussed above, and as will be appreciated by those skilled in the art, the technology described herein is also applicable to other forms of texture data, such as luminance-maps or bump-maps, etc., and to other, non-texture data. In such arrangements the data can be encoded or decoded in an advantageous manner, but each data value will, e.g., represent a luminance value or normal vector, etc., rather than a colour.

Similarly, although the present embodiment has been described primarily with reference to the encoding of square or cubical blocks of texels, other texel block arrangements and configurations, such as the encoding of non-square rectangular blocks of texels and non-cubical rectangular cuboid blocks of texels would be possible, if desired.

FIGS. 3 to 11 illustrate the basic encoded block layouts that the format of the present embodiment will produce. Each encoded block comprises, as discussed above, 128-bits.

Figure 3:
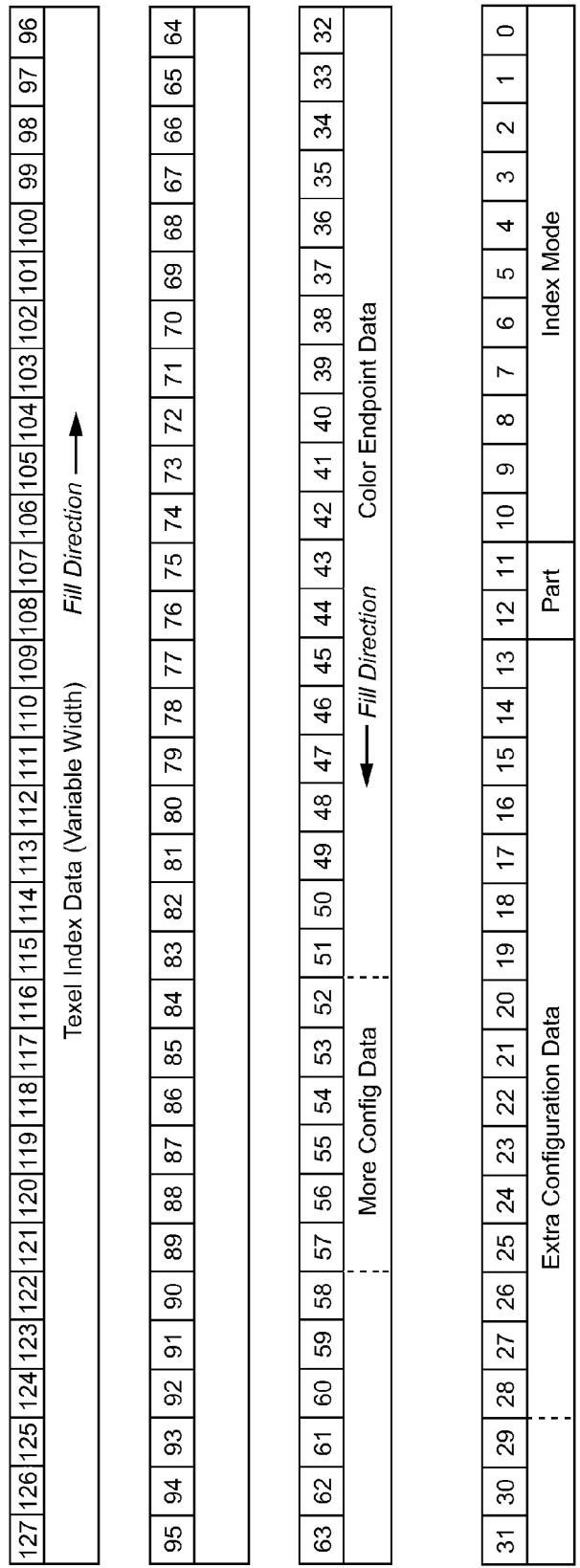

FIG. 3 shows an overview of the basic block layout. Thus it shows the index mode data in bits 0-10, the "partition count-1" data in bits 11-12, and the filling of the remaining space with any necessary extra configuration data, and the respective endpoint colour data and texel index data (which are both of variable width).

Figure 4:
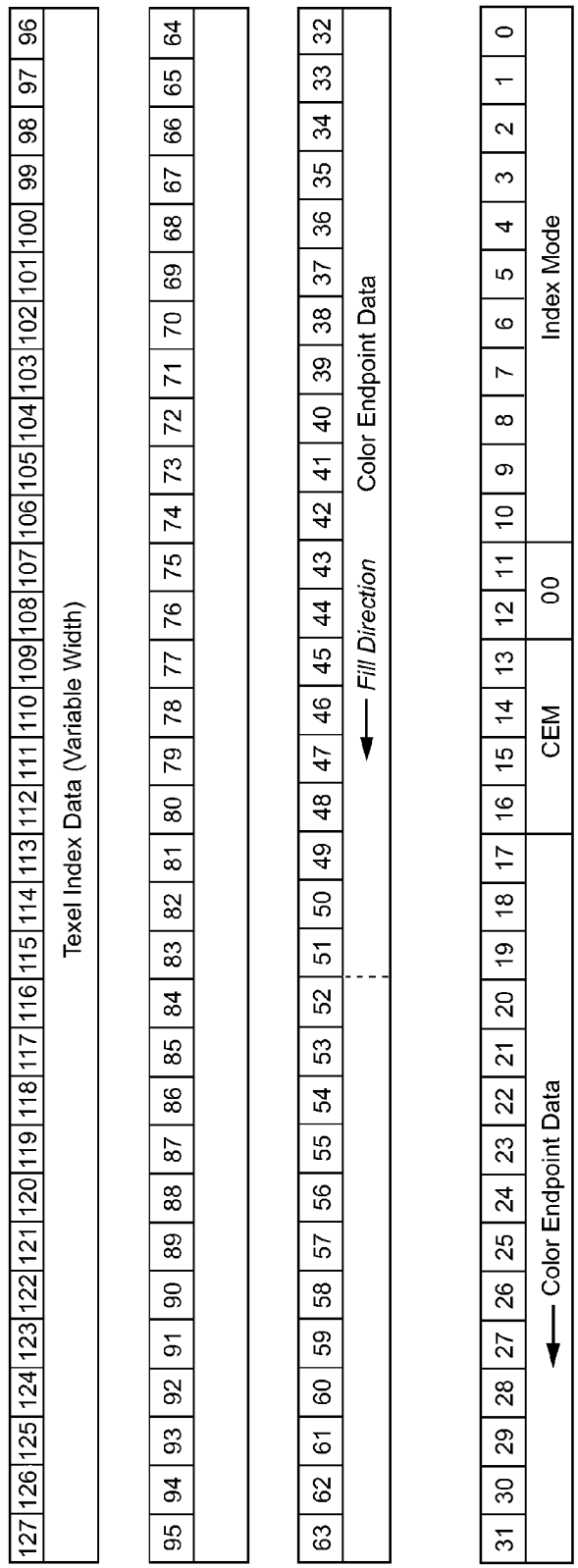

FIG. 4 shows the layout for a non-partitioned block. Thus in this case, the "partition-count-1" data in bits 11-12 is set to "00" and the colour endpoint mode data (shown as CEM in FIG. 4) is placed in bits 13-16.

Figure 5:
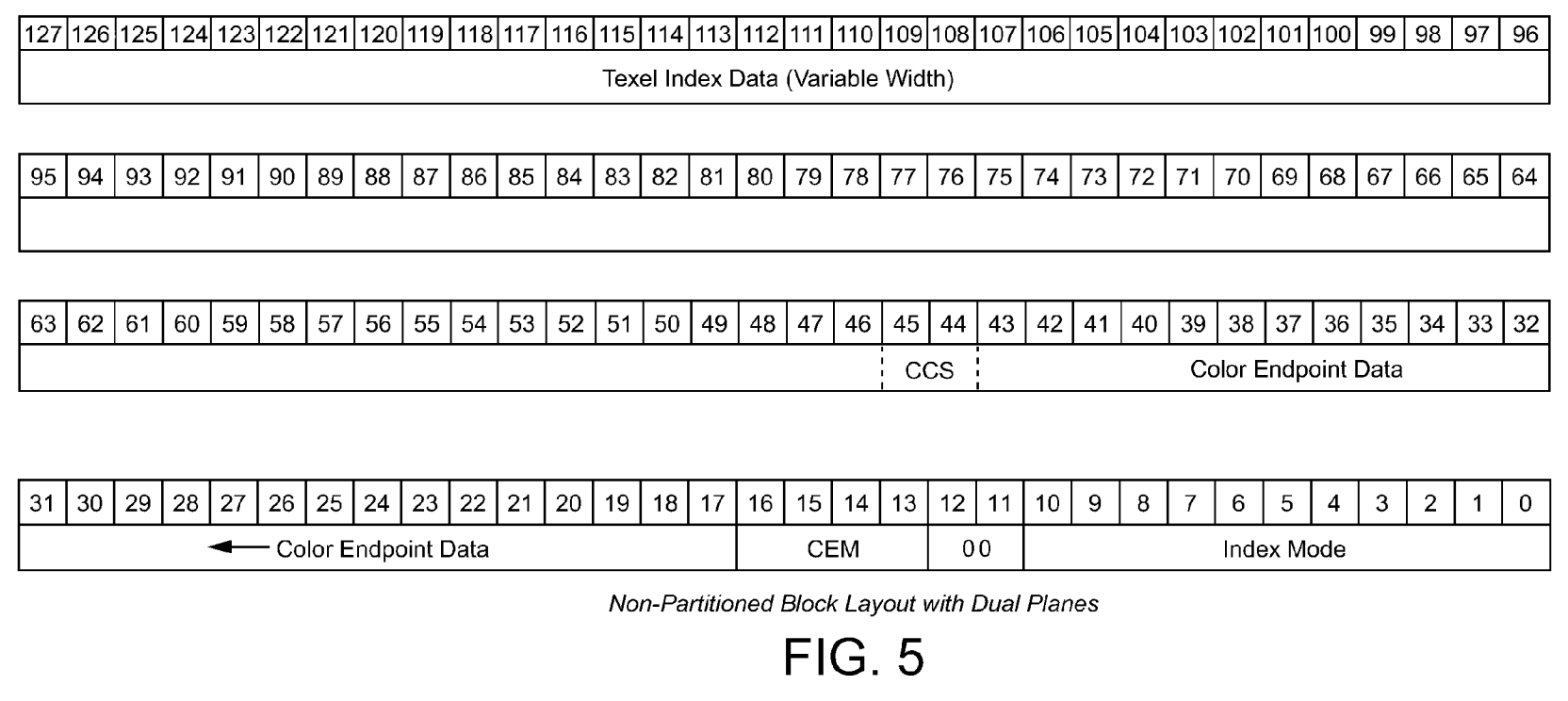

FIG. 5 shows the layout for a non-partitioned block but which uses two index planes. In this case, as shown in FIG. 5, two bits are used to act as the colour component selector (CCS) for the second index plane. These bits appear immediately below the texel index data (which is variable width, as discussed above).

Figure 6:
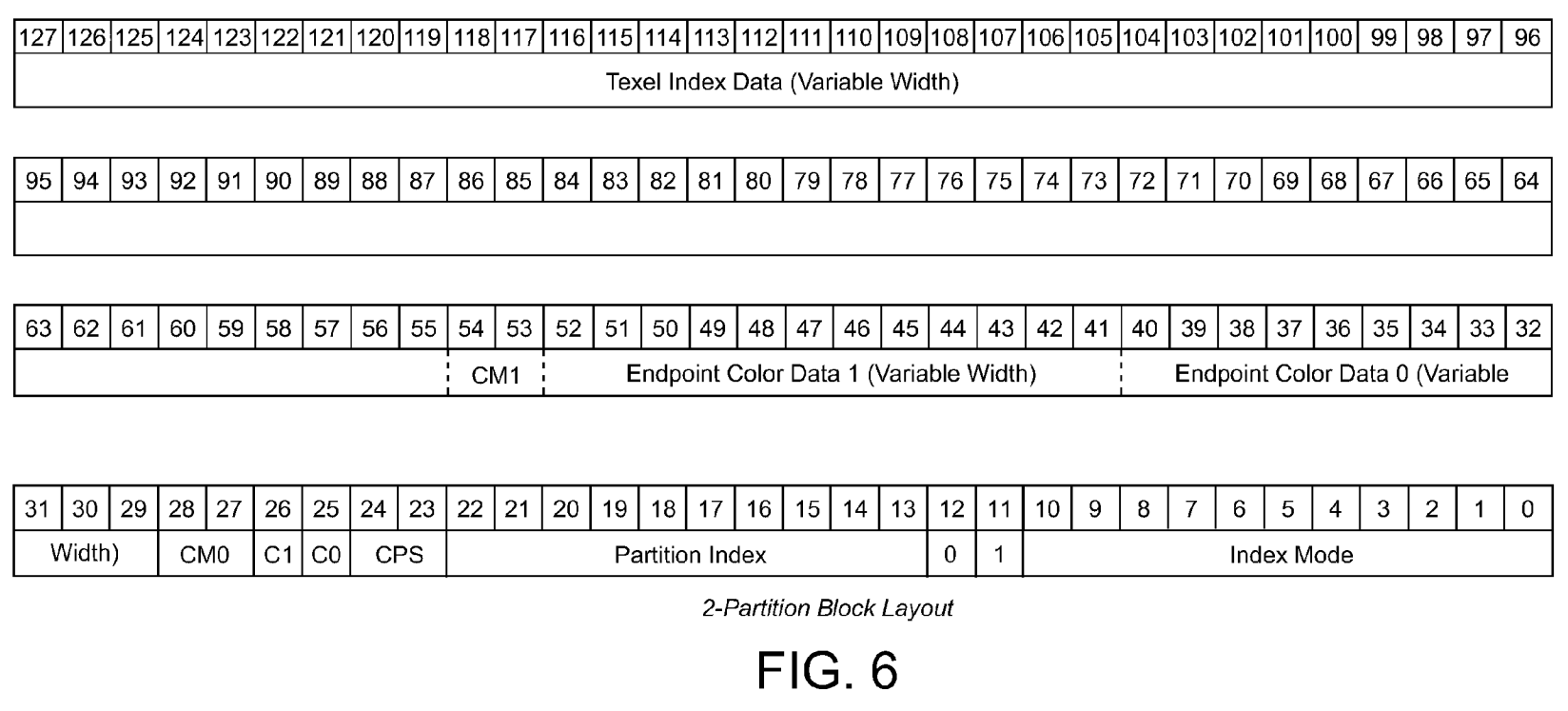

FIG. 6 shows the layout for a block encoding a block of texels (texture data elements) that has been divided into two partitions. In this case, the encoded block includes, as shown in FIG. 6, the "partition count-1" "01" (as there are two partitions) in bits 11-12, and the partition index (seed) for the partitioning pattern generation function in bits 13-22.

The encoded block also includes, as shown in FIG. 6, the colour endpoint mode pair selector (CPS) value in bits 23-24, and colour endpoint mode indicators (information) for each of the two partitions. The colour endpoint mode information comprises a respective colour endpoint class bit Cn and 2-bit colour endpoint mode field CMn for each partition n, and is arranged such that all the colour class bits for all the partitions are emitted first (in partition order), followed by the colour mode fields for each partition (in order). If this all requires more than 6 bits, then the additional bits are stored just below the texel index bits (which will be a variable position, as discussed above). It can be more efficient for a hardware decoder for the colour class bits to be at fixed positions in the encoded block.

Thus, as shown in FIG. 6, in the case of a two partition block, the colour endpoint mode pair selector (CPS) value is placed in bits 23-24, the respective colour class bits, C0, C1, for each partition (the first partition, partition 0, and the second partition, partition 1, respectively) are first placed in bits 25-26 (i.e. after the colour endpoint mode pair selector bits), and the 2-bit colour endpoint mode fields then follow (in partition order), up to the limit of 6-bits, with any remaining bits then being placed just below the texel index data. Thus, the colour endpoint mode indicator for the first partition (partition 0) is placed in bits 27-28 (CM0), and the colour endpoint mode for the second partition (partition 1) is placed in bits 53-54 (CM1). As shown, the additional bits required for the colour endpoint mode for the second partition (CM1) appear immediately below the texel index data. The block also includes appropriate sets of colour endpoint data for the two different partitions (endpoint colour data 0 and endpoint colour data 1, respectively).

FIG. 7 shows the layout for a block that encodes a block of texture data elements that has been divided into three partitions. In this case, as shown in FIG. 7, there are three sets of colour endpoint class and mode data (C0, C1, C2, M (CM0), CM1 and CM2), one for each partition, arranged as discussed above in relation to FIG. 6, together with corresponding sets of endpoint colour data (endpoint colour data 0, endpoint colour data 1 and endpoint colour data 2), one for each partition. In this case the two bits of CM0 (denoted by "M" in FIG. 7) are, as shown in FIG. 7, split between bit 28 and a variable position immediately below CM1. Also, as shown in FIG. 7, the "partition count-1" bits 11-12 are set accordingly to "10" to indicate that this is a three-partition block.

Figure 8:
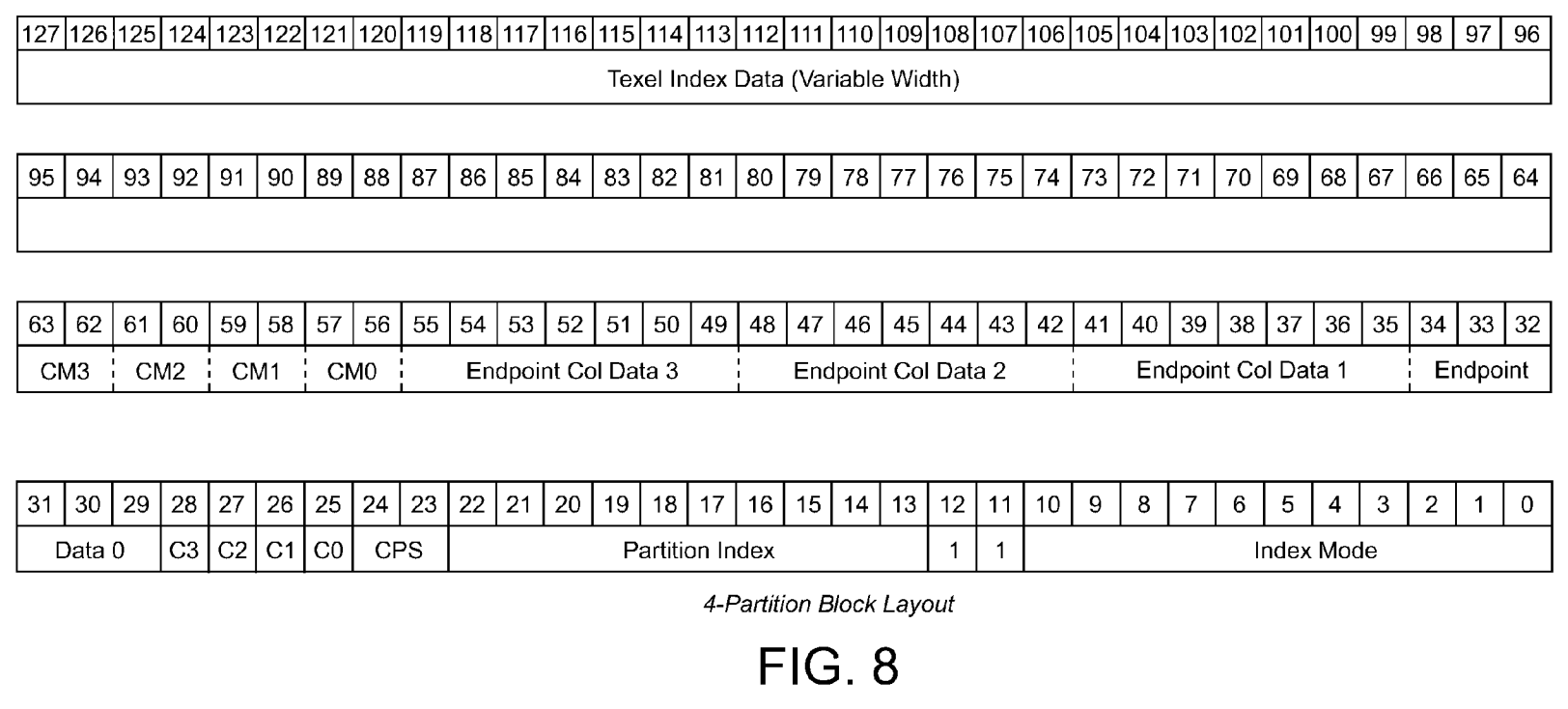

FIG. 8 shows the layout for a block that encodes a set of texture data elements that have been divided into four partitions. In this case, there is accordingly four sets of colour endpoint class and mode data and four sets of corresponding endpoint colour data, one for each partition. Also, as shown in FIG. 8, the "partition count-1" bits 11-12 are set accordingly to "11" to indicate that this is a four-partition block.

Figure 9:
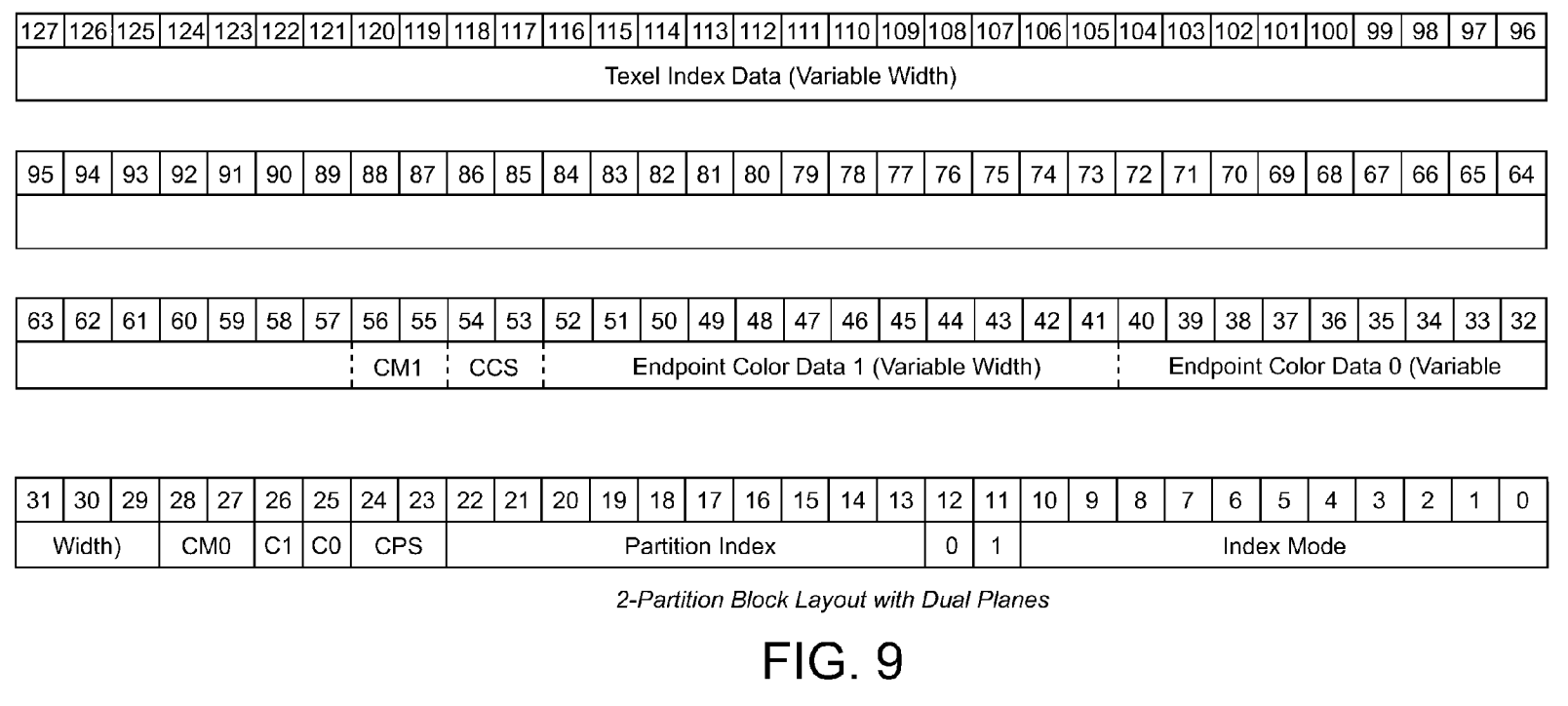

FIG. 9 shows the layout for a block that encodes a set of texture data elements that have been divided into two partitions and that also uses two index planes. In this case, as shown in FIG. 9, the block includes a colour component selector (CCS) field for the second index plane. In this case, this colour component selector appears directly below the additional colour endpoint mode bits (CM1) for the second partition, which are in turn directly below the texel index data bits. (The same layout rule (scheme) applies to three and four partition blocks with dual index planes.)

FIG. 10 shows the layout for a 2D void-extent block (i.e. a block indicating a constant colour value). Thus, as shown, bits 0 to 8 of the block are set to indicate that the block is a void-extent block.

As shown in FIG. 10, the void-extent block includes data indicating the constant colour for the block, and the extent over which that colour extends, in terms of low and high S and T values.

FIG. 11 shows the layout for a 3D void-extent block. This layout essentially corresponds to the 2D void-extent block layout shown in FIG. 10, but includes a further extent component P (as the encoded block represents a 3D block of texture data elements).

The ability to use different indexing schemes, data generation schemes, partitioning arrangements, etc., using a common encoding format in the present embodiment, provides the ability to provide different levels of compression (i.e. to vary the bit rate (the number of bits used per texture data element)) that is being used for a given encoded texture data block. For example, by varying the block size being used, the indexing scheme, data generation scheme, and/or partitioning arrangement, etc., different levels of relative compression can be provided for a given block encoding arrangement and/or for a given texture map or maps, for example.

The Applicants have recognised that such an arrangement may be particularly advantageous when using mipmaps that provide a given texture map for use at different levels of detail. Thus, in an embodiment, the compression rate (and bit rate) is varied for (is different for) different mipmap levels In an embodiment, higher bit rates (i.e. lower levels of data compression are used for smaller mipmap levels (i.e. lower resolution mipmap levels). The Applicants have found that smaller mipmap levels can benefit from higher bit rates (lower levels of compression).

As will be appreciated from the above, the technology described herein, in its embodiments at least, includes a number of new and particularly advantageous features.

For example, using a procedural method (a function) to generate the partitionings allows a much larger number of partition shapes to be provided and supported than would normally be the case. The procedural method enables large sets of partition shapes to be supplied for multiple block sizes without adding to the hardware cost. The procedural nature of the method also makes it easy to extend to volume textures.

The format also allows different partitions to have different color endpoint encodings (it allows, e.g., one partition to be specified with full RGB colors and another partition to be specified with only a grayscale color); these encodings can be specified independently.

The format similarly permits multiple types of content to be present in the same texture; for example, it has distinct color-endpoint encodings for grayscale, RGB, RGB-alpha and HDR colors, and allows these encodings to be freely mixed within a texture; this helps to reduce the number of different formats that need to be dealt with.

The blue_contraction color endpoint method which performs comparison of two RGB colors, and then, based on the comparison result, conditionally contracts the Red and Green color components towards the Blue, effectively provides, for colors with saturation below 50% (which seems to form a rather large majority of all RGB-color content), 1 extra bit of extra resolution for the Red and Green color channels.

The RGB-Scale color endpoint method increases the efficiency of the scheme. In texture compression schemes with endpoint colors and interpolation, it is very common for the two endpoint colors to differ in luminance only; the RGB-Scale color endpoint method encodes one actual color and specifies the second color as just a scaled version of the first color, with a scale-factor in the range 0 . . . 1 being supplied. This endpoint representation requires only 4 integers to be stored, as opposed to 6 integers for two full RGB colors.

The embodiment provides and facilitates fine-grain adjustable resolution of both per-texel indexes and color-components. The resolution can be adjusted in steps that correspond to approximately ⅓ bits; this fine-grained adjustment enables the format to trade off bits between indexes and color endpoints on a per-block basis (e.g. in regions with smooth colors, one would allocate large numbers of bits to the endpoints and comparatively few to the indexes; in regions with large amounts of detail, one would instead spend comparatively fewer bits on the color endpoints and more bits on the indexes, in order to represent the detail).

Furthermore, the resolution for color encoding is implicit and therefore does not need to be encoded; instead, the resolution is picked based on the number of values required by the selected color endpoint types and the number of bits actually available for color encoding. The resolution is always picked as the highest resolution that will fit into the bits actually available.

In connection with the adjustable resolution, the encodings used for the trit-block and the quint-block and the method used to interleave bits trit/quint blocks with low-order bits in order to provide tight bounds on the bit-counts of the Integer Sequence Encoding, also provide enhanced efficiency.

The unquantization method for the color endpoints can take their values from 0 . . . N to 0 . . . 255 with rounding errors no greater than 1 ulp, without using any multipliers.

The encoding format provides a set of features that are orthogonal to each other, such as: color endpoint formats, partitioning, per-texel index precision. This is significantly different from previous formats, where only specific feature combinations (at most) are made available in a non-orthogonal manner.

These features are also orthogonal to the block texel footprint.

Furthermore, the present embodiment can allow a single block of HW decode logic to efficiently support a wide range of different block sizes at little added cost, and can provide the same feature set at every bitrate (e.g. the lowest supported bitrate is 0.88 bpp, and readily supports e.g. HDR or RGB-alpha textures at such bitrates). It also facilitates and supports the use of different bitrates for different mipmap levels.

The Void-Extent block encoding can be used to speed up texture filtering in the case where the texture filtering operation is confined to a known-constant-color region of a texture map.

Although the present embodiment has been described above with reference to a particular texture encoding (and decoding) format, as will be appreciated by those skilled in the art, the principles of the technology described herein relating to selecting which one of a plurality of predefined partitioning patterns to use for encoding a given texel block can be used equally for other texture encoding schemes that support partitioning, such as the BC6 and BC7 texture encoding schemes.

It can be seen from the above that the technology described herein, in its embodiments at least, provides a method and system for quickly determining which one of a set of predetermined partitioning patterns should be used for a texture data element, etc., block to be encoded. It can greatly reduce the time and computational load needed for selecting a partitioning pattern. Encoding speed is a key factor in determining whether a compressed texture format is attractive to developers. The technology described herein makes the encoding process significantly faster as compared, for example, to previous "brute force" techniques.

The foregoing detailed description has been presented for purposes of illustration and description. It is not intended to be exhaustive or to limit the technology described herein to the precise form disclosed. Many modifications and variations are possible in light of the above teaching. The described embodiments were chosen in order to best explain the principles of the technology described herein and its practical application to thereby enable others skilled in the art to best utilize the technology described herein in various embodiments and with various modifications as are suited to the particular use contemplated. It is intended that the scope of the technology described herein be defined by the claims appended hereto.

What is claimed is:

1. A method of determining which one of a set of plural predefined partitioning patterns to use to divide data elements of a block of data elements to be encoded into separate partitions within the block for encoding purposes, the method comprising:
  generating a reference partitioning pattern for the block of data elements using a partitioning function, the partitioning function comprises a clustering function that partitions the data element values into a given number of partitions of data values, and the step of generating a reference partitioning pattern for the block of data elements using a partitioning function comprises using the clustering function to partition the data element values into a given number of partitions of data values, and then allocating each data element in the block to a respective data value partition based on its value, to thereby give the reference partitioning pattern for the block;
  comparing some or all of the predefined partitioning patterns in the set of plural predefined partitioning patterns to the generated reference partitioning pattern; and
  selecting one of the predefined partitioning patterns in the set of plural predefined partitioning patterns as the partitioning pattern to use when encoding the block of data elements on the basis of the comparison.

2. The method of claim 1, wherein the partitioning function comprises a k-means clustering-type function.

3. The method of claim 1, further comprising generating plural reference partitioning patterns, each containing a different number of partitions.

4. The method of claim 1, wherein the step of comparing some or all of the predefined partitioning patterns in the set of plural predefined partitioning patterns to the generated reference partitioning pattern comprises: representing each partitioning pattern to be compared as an array of partition indices, one for each data element in the block, and, for each pair of partitioning patterns being compared, comparing the arrays representing the partitioning patterns to assess how closely they match.

5. The method claim 1, wherein the comparison is carried out for each possible permutation of the partition allocations in the reference partitioning pattern.

6. The method of claim 1, further comprising:
  using the comparison process to identify a set of candidate predefined partitioning patterns;
  subjecting the so-identified candidate predefined partitioning patterns to further analysis; and
  selecting the partitioning pattern to use from the set of identified candidate predefined partitioning patterns on the basis of the further analysis of those identified candidate predefined partitioning patterns.

7. The method of claim 1, further comprising:
  encoding the set of data elements as a block of data representing the data elements using the selected predefined partitioning pattern.

8. The method of claim 7, further comprising including in the encoded data block information to allow a decoder to identify which of the predefined partitioning patterns has been used for the encoded data block.

9. The method of claim 8, further comprising including in the encoded data block information to be used by a decoder to configure a partitioning pattern generation function so as to generate the predefined partitioning pattern that has been used for the encoded data block.

10. The method of claim 1, wherein the data elements are texture data elements for use in a graphics processing system.

11. An apparatus for determining which one of a set of plural predefined partitioning patterns to use to divide data elements of a block of data elements to be encoded into separate partitions within the block for encoding purposes, the apparatus comprising:

processing circuitry configured to generate a reference partitioning pattern for the block of data elements using a partitioning function, the partitioning function comprises a clustering function that partitions the data element values into a given number of partitions of data values, and the processing circuitry configured to generate a reference partitioning pattern for the block of data elements using a partitioning function comprises processing circuitry configured to use the clustering function to partition the data element values into a given number of partitions of data values, and to then allocate each data element in the block to a respective data value partition based on its value, to thereby give the reference partitioning pattern for the block;

processing circuitry configured to compare some or all of the predefined partitioning patterns in the set of plural predefined partitioning patterns to the generated reference partitioning pattern; and processing circuitry configured to select one of the predefined partitioning patterns in the set of plural predefined partitioning patterns as the partitioning pattern to use when encoding the block of data elements on the basis of the comparison.

12. The apparatus of claim 11, wherein the partitioning function comprises a k-means clustering-type function.

13. The apparatus of claim 11, comprising processing circuitry configured to generate plural reference partitioning patterns, each containing a different number of partitions.

14. The apparatus of claim 11, wherein the processing circuitry configured to compare some or all of the predefined partitioning patterns in the set of plural predefined partitioning patterns to the generated reference partitioning pattern comprises:

processing circuitry configured to represent each partitioning pattern to be compared as an array of partition indices, one for each data element in the block, and to, for each pair of partitioning patterns being compared, compare the arrays representing the partitioning patterns to assess how closely they match.

15. The apparatus of claim 11, wherein the comparison is carried out for each possible permutation of the partition allocations in the reference partitioning pattern.

16. The apparatus of claim 11, comprising:

processing circuitry configured to use the comparison process to identify a set of candidate predefined partitioning patterns;

processing circuitry configured to subject the so-identified candidate predefined partitioning patterns to further analysis; and processing circuitry configured to select the partitioning pattern to use from the set of identified candidate predefined partitioning patterns on the basis of the further analysis of those identified candidate predefined partitioning patterns.

17. The apparatus of claim 11, further comprising:

processing circuitry configured to encode the set of data elements as a block of data representing the data elements using the selected predefined partitioning pattern.

18. The apparatus of claim 17, comprising processing circuitry configured to include in the encoded data block information to allow a decoder to identify which of the predefined partitioning patterns has been used for the encoded data block.

19. The apparatus of claim 18, comprising processing circuitry configured to include in the encoded data block information to be used by a decoder to configure a partitioning pattern generation function so as to generate the predefined partitioning pattern that has been used for the encoded data block.

20. The apparatus of claim 11, wherein the data elements are texture data elements for use in a graphics processing system.

21. A non-transitory computer readable storage medium storing computer software code which when executing on one or more processors performs a method of determining which one of a set of plural predefined partitioning patterns to use to divide data elements of a block of data elements to be encoded into separate partitions within the block for encoding purposes, the method comprising:

generating a reference partitioning pattern for the block of data elements using a partitioning function, the partitioning function comprises a clustering function that partitions the data element values into a given number of partitions of data values, and the step of generating a reference partitioning pattern for the block of data elements using a partitioning function comprises using the clustering function to partition the data element values into a given number of partitions of data values, and then allocating each data element in the block to a respective data value partition based on its value, to thereby give the reference partitioning pattern for the block;

comparing some or all of the predefined partitioning patterns in the set of plural predefined partitioning patterns to the generated reference partitioning pattern; and selecting one of the predefined partitioning patterns in the set of plural predefined partitioning patterns as the partitioning pattern to use when encoding the block of data elements on the basis of the comparison.

* * * * *